United States Patent
Sakuma et al.

(10) Patent No.: US 10,254,502 B2
(45) Date of Patent: Apr. 9, 2019

(54) LENS ASSEMBLY AND IMAGING DEVICE

(71) Applicant: KANTATSU CO., LTD., Yaita-shi, Tochigi (JP)

(72) Inventors: Akio Sakuma, Sukagawa (JP); Makoto Ikeda, Sukagawa (JP)

(73) Assignee: KANTATSU CO., LTD., Yaita (JP)

( * ) Notice: Subject to any disclaimer, the term of this patent is extended or adjusted under 35 U.S.C. 154(b) by 0 days.

(21) Appl. No.: 15/335,150

(22) Filed: Oct. 26, 2016

(65) Prior Publication Data

US 2017/0276895 A1 Sep. 28, 2017

(30) Foreign Application Priority Data

Oct. 26, 2015 (JP) .................. 2015-209709
Jul. 4, 2016 (JP) .................. 2016-132354

(51) Int. Cl.
*G02B 7/02* (2006.01)
*H04N 5/225* (2006.01)

(52) U.S. Cl.
CPC ............. *G02B 7/022* (2013.01); *G02B 7/028* (2013.01); *H04N 5/2254* (2013.01); *G02B 7/021* (2013.01)

(58) Field of Classification Search
CPC ........ G02B 7/028; G02B 7/008; G02B 7/021; G02B 23/2476; G02B 7/00; G02B 7/02; G02B 7/181; G02B 1/00; G02B 27/0955; H01S 5/02415; H01S 5/022
See application file for complete search history.

(56) References Cited

U.S. PATENT DOCUMENTS 9,594,228 B1* 3/2017 Feng .................. G02B 7/028
2010/0001071 A1* 1/2010 Ohara .................. G02B 7/021
235/454
2016/0202443 A1 7/2016 Knutsson et al.

FOREIGN PATENT DOCUMENTS

DE  10 2008 047 277 A1  4/2010
JP  2012-118404 A  6/2012
WO  2015/032512 A1  3/2015

* cited by examiner

*Primary Examiner* — Alicia M Harrington
(74) *Attorney, Agent, or Firm* — Oliff PLC

(57) ABSTRACT

A lens assembly and an imaging device for realizing low-profileness, and for effectively compensating a change in back focus generated by a change in atmospheric temperature. A lens holder contained in a lens assembly of an imaging device includes an inner frame on which a lens unit is attached, a holding frame provided with a lower end surface fixing a positional relationship with an image sensor, a linking frame for linking the inner frame and the holding frame. The lens holder extends and contracts so that the inner frame and the holding frame distance the lens unit from the image sensor when back focus of the lens unit extends due to change in atmospheric temperature, and brings the lens unit closer to the image sensor when the back focus contracts.

12 Claims, 11 Drawing Sheets

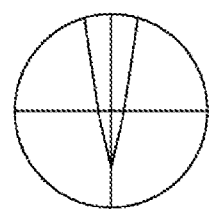 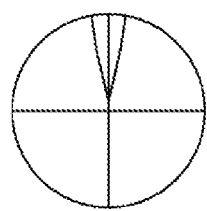
Misalignment on +Side
Misalignment on −Side
FIG. 8A
FIG. 8B

LENS ASSEMBLY AND IMAGING DEVICE

FIELD OF THE INVENTION

The present invention relates to a lens assembly having a lens unit for forming an image of an object on an image sensor and a lens holder for holding the lens unit, particularly to a lens assembly having a lens holder which compensates for a change in back focus of an optical system of a lens unit that accompanies a change in atmospheric temperature, and to an imaging device which has the lens assembly.

DESCRIPTION OF THE RELATED ART

A fixed focus imaging device has, for example, a lens unit having a plurality of lenses and a barrel for containing the lenses, and a lens holder for holding the lens unit. In an imaging device, the lens holder directly or indirectly fixes the lens unit onto a substrate onto which an image sensor, such as a CCD sensor or C-MOS sensor, is mounted. That is, the mutual positional relationship of the image sensor and the lens unit is fixed by the lens holder. When characteristics of a lens in the lens unit change due to the change in the atmospheric temperature, a change may be occurred in back focus of an optical system of the lens unit, and there may cause a risk of deterioration of image quality such as image blur due to misalignment of the focal point.

For example, according to JP-A-2012-118404 (Patent Document 1), an imaging device is disclosed which suppresses image deterioration due to a change in atmospheric temperature.

According to the imaging device disclosed in Patent Document 1, a lens unit composed of plastic lenses is held by a lens holder, and an image sensor holding frame is fixed on an attachment reference surface of the lens holder. The image sensor holding frame is formed of a material having a larger linear thermal expansion coefficient than the linear thermal expansion coefficient of the lens holder, and an extended part that extends in parallel to an optical axis is provided between the attachment reference surface and the image sensor. Even when the focal length of the lens unit fluctuates due to the change in the atmospheric temperature, the extended part extends and contracts according to this change in atmospheric temperature, the distance between plastic lenses and the image sensor is changed, and image deterioration is suppressed.

This type of imaging device is installed on a variety of electronic instruments such as a portable device, a Personal Digital Assistance (PDA), a drive recorder, and a surveillance camera. In recent years, the electronic instruments on which the imaging devices are installed are becoming smaller and thinner, and the imaging devices installed thereon are sought to be smaller and lower-profile. However, in the imaging device disclosed in Patent Document 1, it is necessary to form the extended part having sufficient length for securing an expansion or contraction amount due to a change in the atmospheric temperature and compensating for a change in back focus. As such, when an extended part having sufficient length is formed, the overall height of the imaging device becomes higher, therefore there may be difficult to meet the demand of low-profileness of imaging devices.

SUMMARY OF THE INVENTION

In view of the above problem, an object of the present invention is to provide a lens assembly having a lens holder that makes a low-profileness possible and effectively compensates for changes in back focus occurring due to changes in atmospheric temperature, and an imaging device having the lens assembly.

In order to achieve the above-mentioned object, according to the present invention, there is provided a lens assembly comprising a lens unit disposed facing an image sensor and a lens holder for holding said lens unit, wherein said lens holder comprises:

an inner part to which said lens unit is attached,
an outer part that is disposed on the outside of said inner part relative to an optical axis of said lens unit, and provided with a reference surface to which positional relationship with the image sensor is fixed, and
a linking part for linking said inner part and said outer part, wherein
an inner extension and contraction part for extending and contracting in the direction of the optical axis of said lens unit associated with a change in atmospheric temperature is provided between an attachment location of said linking part on said inner part and an attachment location of said lens unit,
an outer extension and contraction part for extending and contracting in the direction of the optical axis of said lens unit associated with a change in atmospheric temperature is provided between an attachment location of said linking part on said outer part and said reference surface, and
said inner extension and contraction part and said outer extension and contraction part are designed to extend and contract so as to distance said lens unit from said image sensor when back focus of said lens unit extends due to a change in atmospheric temperature, and to bring said lens unit close to said image sensor when the back focus of said lens unit contracts due to a change in atmospheric temperature.

According to the lens assembly of the present invention, the lens holder comprises the inner part and the outer part linked each other by a linking part, and the inner extension and contraction part of the inner part of the lens holder and said outer extension and contraction part of the outer part of the lens holder are designed to extend and contract so as to distance the lens unit from the image sensor when back focus of the lens unit extends due to a change in atmospheric temperature, and to bring the lens unit close to the image sensor when the back focus of the lens unit contracts due to a change in atmospheric temperature. Because change in back focus due to the change in atmospheric temperature is compensated by two extension and contraction parts disposed at inside and outside, an extension and contraction amount can be effectively secured without extending the extension and contraction part in the direction of the optical axis.

According to the present invention, it is preferable that the attachment location of said linking part on said inner part is disposed closer to said image sensor than the attachment location of said linking part on said outer part. Furthermore, it is also preferable that the attachment location of said linking part on said inner part is provided on an end part of said image sensor side of said inner part, and the attachment location of said linking part on said outer part is provided on an end part of an opposite side of said image sensor side of said outer part. Thus, an extension and contraction amount can be effectively secured.

According to the present invention, it is preferable that thermal expansion coefficient of said linking part is smaller than the thermal expansion coefficient of said inner extension and contraction part and said outer extension and contraction part. Thus, there can be effectively suppressed cancellation of the extension and contraction amount of the inner extension and contraction part and the outer extension and contraction part by the extension and contraction amount associated with a change in atmospheric temperature.

According to the present invention, it is preferable that below expression (A) is satisfied:

$$0.5 \leq \{(a1 \times L1 - a2 \times L2 + a3 \times L3) \times \Delta T\}/\Delta Bf \leq 1.5 \quad (A)$$

where
a1: a thermal expansion coefficient of an outer extension and contraction part
a2: a thermal expansion coefficient of a linking part
a3: a thermal expansion coefficient of an inner extension and contraction part
L1: a distance in a direction of an optical axis from an attachment location of a linking part of an outer part to a reference surface
L2: a distance in a direction of an optical axis from an attachment location of a outer part of a linking part to an attachment location of an inner part
L3: a distance in a direction of an optical axis from an attachment location of a linking part of an inner part to an attachment location of a lens unit
$\Delta T$: a change amount in atmospheric temperature
$\Delta Bf$: a change amount in back focus per a change amount in atmospheric temperature. Thus, an extension and contraction amount of the lens holder becomes closer to a change amount of the back focus, and can be effectively compensated thereby.

In order to achieve the above-described object, according to the present invention, there is provided a lens assembly comprising a lens unit disposed by facing an image sensor, and a lens holder for holding said lens unit, wherein said lens holder comprises:

an inner part to which said lens unit is attached,
a middle part disposed on the outside of said inner part relative to an optical axis of said lens unit,
an outer part that is disposed on the outside of said middle part relative to an optical axis of said lens unit, and provided with a reference surface to which positional relationship with said image sensor is fixed,
a first linking part for linking said outer part and said middle part, and
a second linking part for linking said middle part and said inner part, wherein
an inner extension and contraction part for extending and contracting in the direction of the optical axis of said lens unit associated with a change in atmospheric temperature is provided between an attachment location of said second linking part on said inner part and an attachment location of said lens unit,
a middle extension and contraction part for extending and contracting in the direction of the optical axis of said lens unit associated with a change in atmospheric temperature is provided between an attachment location of said first linking part on said middle part and the attachment location of said second linking part,
an outer extension and contraction part for extending and contracting in the direction of the optical axis of said lens unit associated with a change in atmospheric temperature is provided between the attachment location of the first linking part on said outer part and said reference surface, and said inner extension and contraction part, said middle extension and contraction part, and said outer extension and contraction part are designed to extend and contract so as to distance said lens unit from said image sensor when the back focus of said lens unit extends due to a change in atmospheric temperature, and contract so as to bring said lens unit closer to said image sensor when the back focus of said lens unit contracts due to a change in atmospheric temperature.

According to a lens assembly of the present invention, a lens holder comprises an inner part, a middle part, and an outer part mutually linked by a first linking part and a second linking part, and the inside extension and contraction part of the inner part, the middle extension and contraction part of the middle part, and the outer extension and contraction part of the outer part of the lens holder extend and contract so as to distance the lens unit from the image sensor when the back focus of the lens unit extends due to a change in atmospheric temperature, and to bring the lens unit closer to the image sensor when the back focus of the lens unit contracts. Thus, changes in back focus due to a change in atmospheric temperature are compensated by the three extension and contraction parts disposed on the inside, the middle, and the outside respectively, thereby an expansion and contraction amount can be effectively secured without extending the expansion and contraction parts in the direction of the optical axis.

According to the present invention, it is preferable that the attachment location of said second linking part on said inner part is disposed closer to said image sensor than the attachment location of said second linking part on said middle part, and the attachment location of said first linking part on said middle part is disposed closer to said image sensor than the attachment location of said first linking part on said outer part. It is also preferable that the attachment location of said second linking part on said inner part is disposed on an end part of said image sensor side of said inner part, the attachment location of said second linking part on said middle part is disposed on an end part of an opposite side of said image sensor side of said middle part, the attachment location of said first linking part on said middle part is disposed on an end part of said image sensor side of said middle part, and the attachment location of said first linking part on said outer part is disposed on an end part of an opposite side of said image sensor side of said outer part. Thus, an extension and contraction amount can be effectively secured.

In the present invention, it is preferable that thermal expansion coefficient of said first and second linking parts is smaller than the thermal expansion coefficients of said inner extension and contraction part, said middle extension and contraction part, and said outer extension and contraction part. Thus, there can be effectively suppressed cancellation of the extension and contraction amount of the inner extension and contraction part, the middle extension and contraction part, and the outer extension and contraction part by the extension and contraction amount of the first linking part and the second linking part associated with a change in atmospheric temperature.

According to the present invention, it is preferable that below expression (B) is satisfied:

$$0.5 \leq \{(a1 \times L1 - a2 \times L2 + a3 \times L3 - a4 \times L4 + a5 \times L5) \times \Delta T\}/\Delta Bf \leq 1.5 \quad (B)$$

where
$\alpha 1$: thermal expansion coefficient of an outer extension and contraction part α2: thermal expansion coefficient of the first linking part α3: thermal expansion coefficient of a middle extension and contraction part α4: thermal expansion coefficient of the second linking part α5: thermal expansion coefficient of an inner extension and contraction part L1: a distance in a direction of the optical axis from an attachment location of the first linking part on the outer part to a reference surface L2: a distance in a direction of the optical axis from the attachment location of the outer part of the first linking part to the attachment location of the middle part L3: a distance in a direction of the optical axis from the attachment location of the first linking part of the middle part to the attachment location of the second linking part L4: a distance in a direction of the optical axis from the attachment location of the middle part of the second linking part to the attachment location of the inner part L5: a distance in a direction of the optical axis from the attachment location of the second linking part of the inner part to the attachment location of the lens unit ΔT: a change amount in atmospheric temperature ΔBf: a change amount in back focus per a change amount in atmospheric temperature.

Thus, the expansion and contraction amount of the lens holder becomes close to the change amount of the back focus, and can be effectively compensated thereby.

In order to achieve the above-described object, according to the present invention, there is provided a lens assembly comprising a lens unit disposed facing an image sensor and a lens holder for holding said lens unit, wherein said lens holder comprises:

an inner part to which said lens unit is attached, a plurality of middle parts disposed in order from said inside to said outside relative to an optical axis of said lens unit, an outer part that is disposed outside of said plurality of middle parts relative to an optical axis of said lens unit, and provided with a reference surface to which positional relationship with the image sensor is fixed, a first linking part for linking said outermost middle parts and said outer part, a second linking part for linking said innermost middle parts and said inner part, and a third linking part for linking said middle parts adjacent to each other, wherein an inner extension and contraction part for extending and contracting in the direction of the optical axis of said lens unit associated with a change in atmospheric temperature is provided between an attachment location of said second linking part of said inner part and an attachment location of said lens unit, an middle extension and contraction part for extending and contracting in the direction of the optical axis of said lens unit associated with a change in atmospheric temperature is provided between an attachment location of said first linking part of said outermost middle part and an attachment location of said third linking part, and between an attachment location of said second linking part of said innermost middle part and said third linking part, an outer extension and contraction part for extending and contracting in the direction of the optical axis of said lens unit associated with a change in atmospheric temperature is disposed between an attachment location of said first linking part of said outer part and a reference surface, and said inner extension and contraction part, said plurality of middle extension and contraction parts, and said outer extension and contraction part are designed to extend and contract so as to distance said lens unit from said image sensor when back focus of said lens unit extends due to a change in atmospheric temperature, and to bring said lens unit close to said image sensor when the back focus of said lens unit contracts due to a change in atmospheric temperature.

According to a lens assembly of the present invention, a lens holder comprises an inner part, a plurality of middle parts, and an outer part mutually linked by a first linking part, a second linking part, and a third linking part, and the inner extension and contraction part of the inner part, the middle extension and contraction part of the plurality of middle parts, and the outer extension and contraction part of the outer part of the lens holder extends and contracts so as to distance the lens unit from the image sensor when the back focus of the lens unit extends due to a change in atmospheric temperature, and to bring the lens unit closer to the image sensor when the back focus of the lens unit contracts. Thus, changes in back focus due to a change in atmospheric temperature are compensated by the plurality of extension and contraction parts disposed on the inside, the middle, and the outside, and thereby the extension and contraction amount is effectively secured without extending the extension and contraction parts in the direction of the optical axis.

In the present invention, it if preferable that said lens holder comprises three or more said middle parts and a plurality of said third linking parts, and the middle extension and contraction parts for extending and contracting in the direction of the optical axis of said lens unit associated with a change in atmospheric temperature is provided between an attachment location of one of said third linking parts of said middle part disposed between said two middle parts and an attachment location of said other third linking parts. Thus, the extension and contraction amount can be effectively secured.

An imaging device according to another embodiment of the present invention comprises the above-described a lens assembly and an image sensor disposed facing said lens unit of said lens assembly.

According to the present invention, because the above-described lens assembly is provided, a change in back focus due to a change in atmospheric temperature is compensated by a plurality of expansion and contraction parts, thereby an expansion and contraction amount is effectively secured without extending the expansion and contraction parts in the direction of the optical axis.

According to the present invention, because the expansion and contraction amount due to a change in atmospheric temperature can be effectively secured, a change in back focus occurring due to a change in atmospheric temperature can be effectively compensated while achieving a lower-profileness.

BRIEF DESCRIPTION OF THE DRAWINGS

FIG. 8A and FIG. 8B are explanation drawings enlarging part B of FIG. 7, showing a change in back focus associated with a change in atmospheric temperature, FIG. 8A schematically shows a change in + side and FIG. 8B schematically shows a change in − side;

DETAILED DESCRIPTION OF THE PREFERRED EMBODIMENTS

Hereinafter, an imaging device according to an embodiment of the present invention is described with reference to drawings.

First Embodiment

Figure 1:
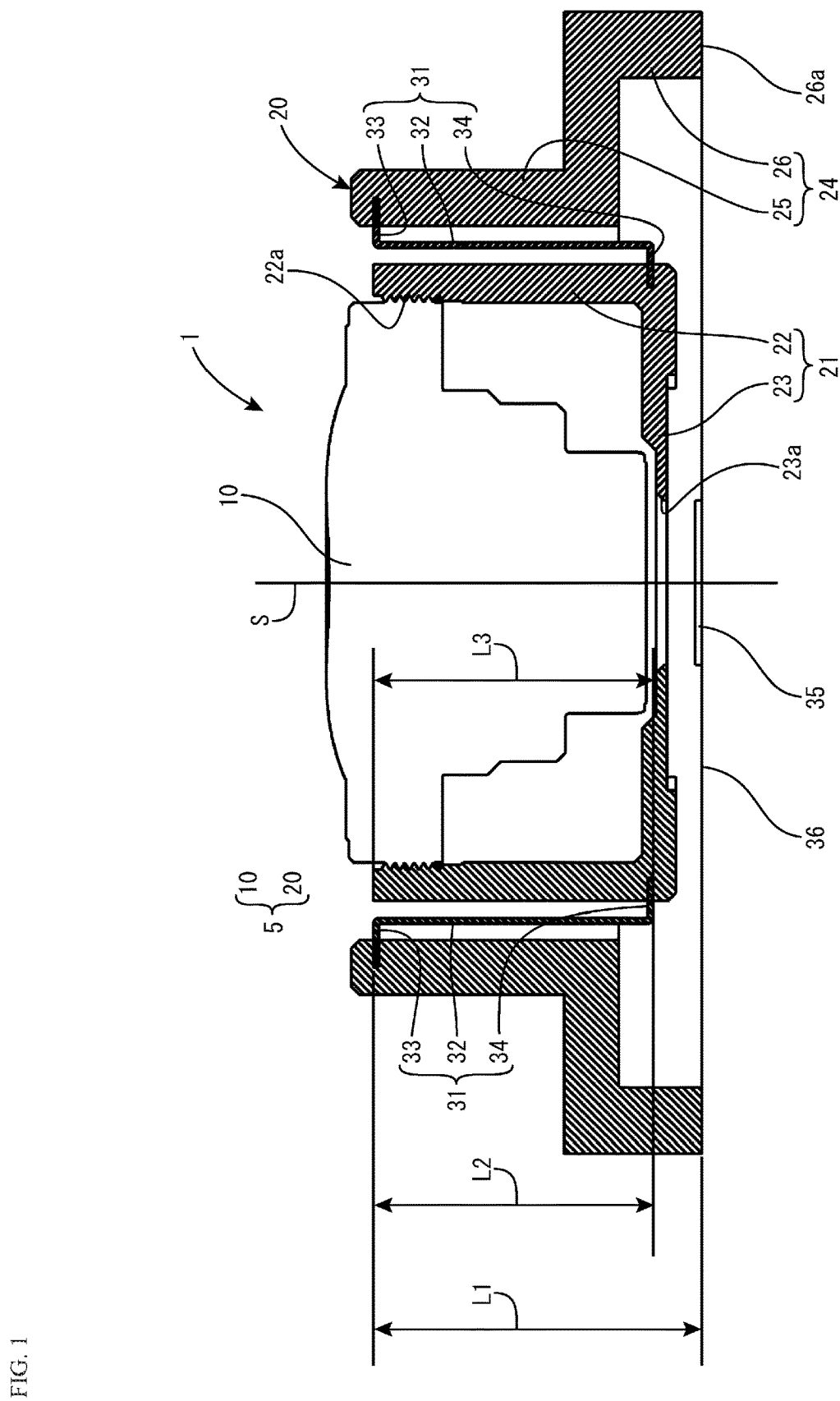
FIG. 1 is a sectional view showing an imaging device according to a first embodiment of the present invention.
Figure 2:
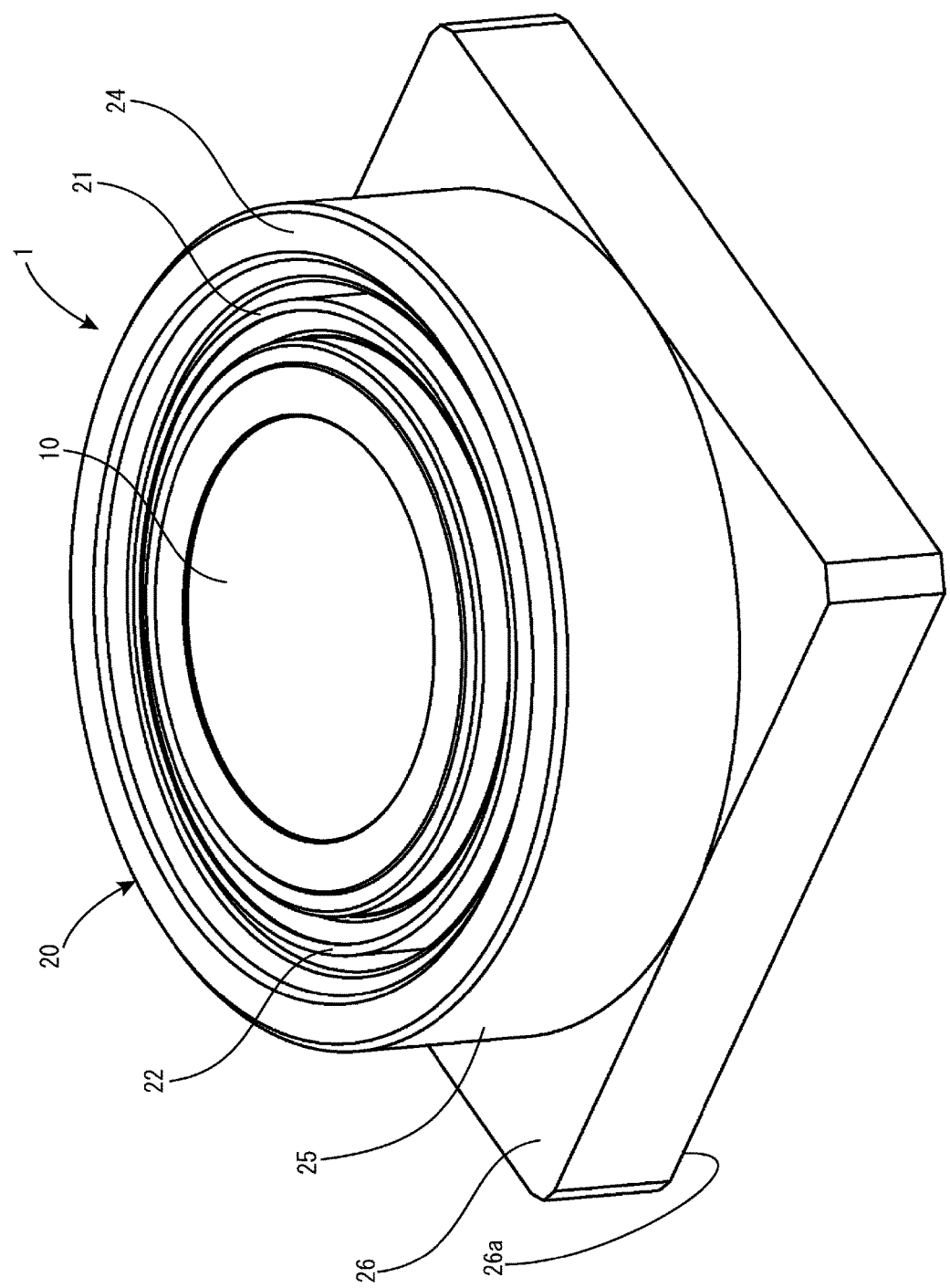
FIG. 2 is a perspective view showing an imaging device of FIG. 1.
Figure 3:
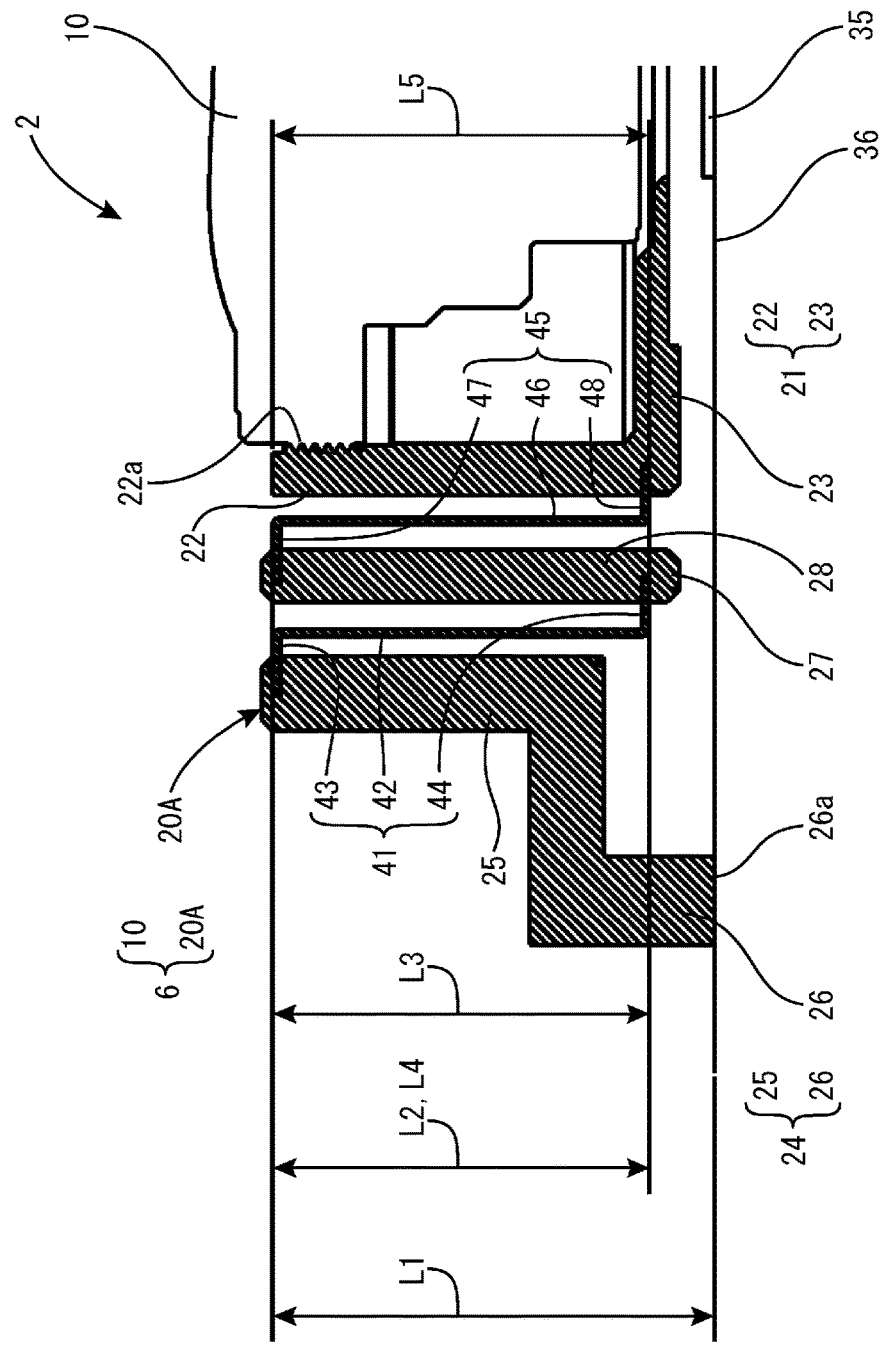
FIG. 3 is a partial sectional view showing an imaging device according to a second embodiment of the present invention.
Figure 4:
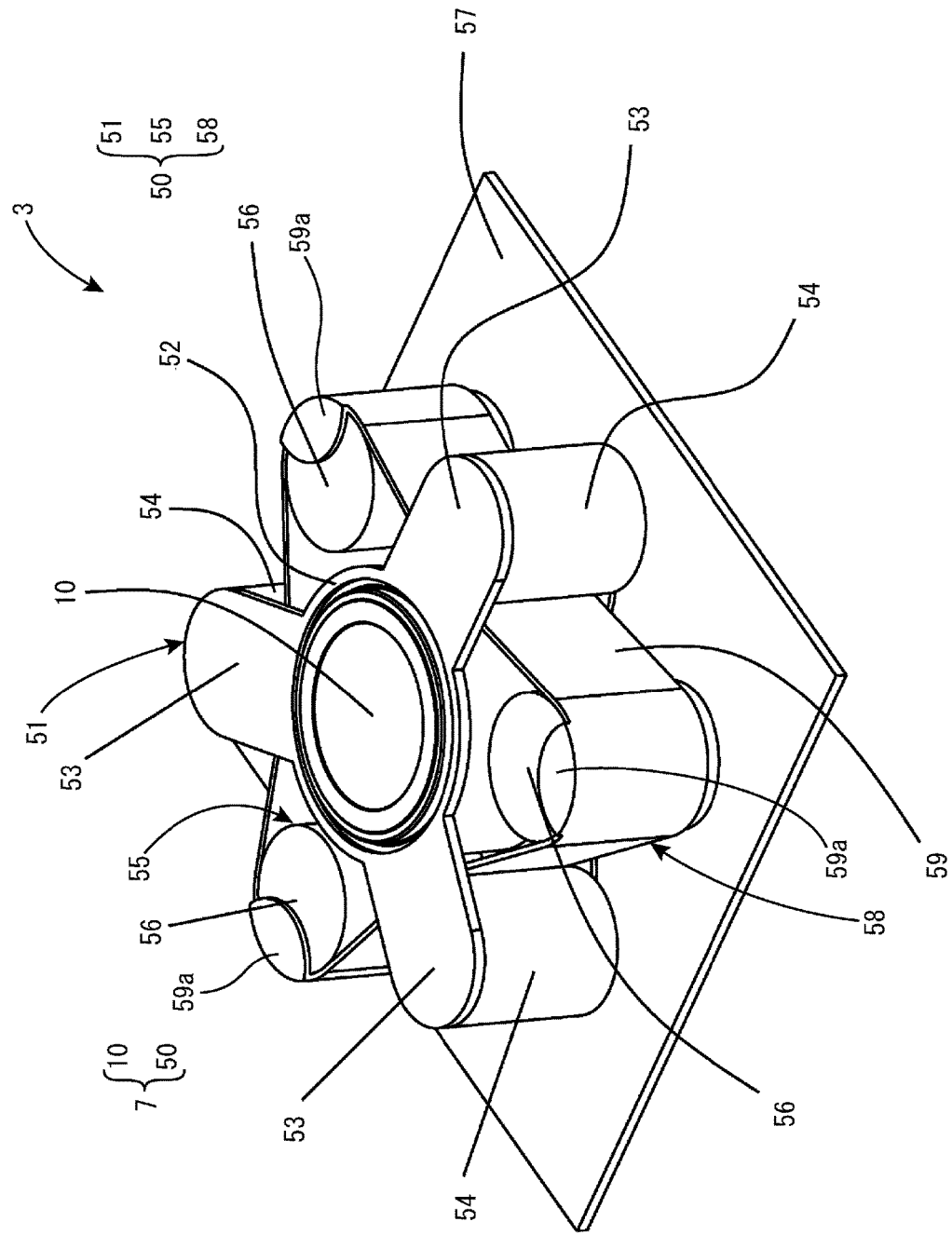
FIG. 4 is a perspective view showing an imaging device according to a third embodiment of the present invention.

FIG. 1 and FIG. 2 show an imaging device 1 according to a first embodiment of the present invention. For convenience in description, the upward direction of FIG. 1 is called as the object side, and the downward direction is called as the image sensor side; and "up and down" are defined with FIG. 1 as the reference (this is the same for FIG. 3 showing a second embodiment, and for FIG. 4 showing a third embodiment). "Up and down" illustrate a relative positional relationship of each component member, and do not illustrate an absolute positional relationship.

As shown in FIG. 1, the imaging device 1 of the present embodiment comprises a lens assembly 5 and a substrate 36 on which the image sensor 35 is mounted.

The lens assembly 5 comprises a lens unit 10 and a lens holder 20.

The lens unit 10 comprises a plurality of lenses which is not illustrated, and a barrel for containing the plurality of lenses. A plurality of plastic lenses are contained inside the barrel of the lens unit 10 of the present embodiment, however, a plurality of lenses composed of a combination of glass lenses and plastic lenses, or a single plastic lens may be contained.

The lens holder 20 comprises an inner frame 21 as an inner part, a holding frame 24 as an outer part, and a linking frame 31 as a linking part.

The inner frame 21 is formed in a bottomed cylindrical shape having an inner tube 22 and a bottom wall 23 as one body. The inner tube 22 is formed in a cylindrical shape, and on an inner peripheral surface at the upper end part, a female screw part 22a is formed into which the lens unit 10 is screwed. When the lens unit 10 is screwed into the female screw part 22a of the inner tube 22, the inner tube 22 is disposed on the same axis as an optical axis S of the lens unit 10. The bottom wall 23 is provided as one body on the lower end part of the inner tube 22, and on the center part thereof, an open aperture 23a is formed facing the image sensor 35.

The holding frame 24 comprises an outer tube 25 and a frame part 26 as one body. The outer tube 25 is formed in a cylindrical shape with a larger radius than the inner tube 22 of the inner frame 21. The outer tube 25 is disposed on the same axis as the optical axis S of the lens unit 10 in a manner that the inner tube 22 is disposed therein. The frame part 26 is formed as a rectangular frame in a plan view, and is linked with the lower end part of the outer tube 25. The frame part 26 is provided a lower end surface 26a facing downwardly, and the lower end surface 26a is fixed to the substrate 36.

Because the image sensor 35 is mounted (fixed) on the substrate 36, the lower end surface 26a fixed on the substrate 36 becomes the reference surface to which the positional relationship with the image sensor 35 is fixed. According to the present embodiment, the lower end surface 26a is an actual surface, but instead, for example, a virtual surface defined by a plurality of points may become the reference surface to which the positional relationship with the image sensor 35 is fixed.

The linking frame 31 is disposed between the inner tube 22 of the inner frame 21 and the outer tube 25 of the holding frame 24, and comprises a cylindrical part 32, an upper flange part 33, and a lower flange part 34 as one body. The cylindrical part 32 is formed in a cylindrical shape and disposed on the same axis as the optical axis S of the lens unit 10. The upper flange part 33 is linked so as to extend outwardly from the upper end peripheral edge of the cylindrical part 32, and is buried and attached to the inner peripheral surface at the upper end part of the outer tube 25 as one body by using an appropriate method, such as insert molding. The lower flange part 34 is linked so as to extend inwardly from the lower end peripheral edge of the cylindrical part 32, and is buried and attached to an outer peripheral surface at the lower end part of the inner tube 22 as one body by using an appropriate method, such as insert molding. The linking frame 31 is thereby linked as one body to the inner tube 22 and the outer tube 25.

According to the present embodiment, in order from the inside to the outside, there are concentrically disposed the inner tube 22 of the inner frame 21, the cylindrical part 32 of the linking frame 31, and the outer tube 25 of the holding frame 24. The lens holder 20 is a three-layered structure.

The inner frame 21 holds the lens unit 10 by screwing the lens unit 10 into the female screw part 22a of the inner tube 22, the inner frame 24 is linked to the inner frame 21 by the linking frame 31, and the lower end surface 26a is fixed to the substrate 36. The lens unit 10 held by the inner frame 21 is disposed so as to face the image sensor 35.

The inner frame 21 and the holding frame 24 described above are formed by using a resin material, and the linking frame 31 is formed by using a metal material having a smaller thermal expansion coefficient than the thermal expansion coefficient of the resin material. When the atmospheric temperature changes, the inner frame 21 and the holding frame 24 greatly extend and contract in the direction of the optical axis S in comparison with the linking frame 31. According to the present embodiment, a polycarbonate resin such as Panlite™ is used as a resin material, and an aluminum alloy (aluminum bronze) is used as a metal material.

In the imaging device 1 described above, the back focus of the lens unit 10 extends when the atmospheric temperature increases, at this time, the inner frame 21 and the holding frame 24 that are mutually linked by the linking frame 31 extend in the direction of the optical axis S respectively, and distance the lens unit 10 from the image sensor 35. Further, in the imaging device 1, the back focus of the lens unit 10 contracts when the atmospheric temperature decreases; at this time, the inner frame 21 and the holding frame 24 contract in the direction of the optical axis S respectively, and brings the lens unit 10 closer to the image sensor 35. That is, the imaging device 1 can cancel a change in the back focus of the lens unit 10 associated with a change in atmospheric temperature by extension and contraction of the inner frame 21 and the holding frame 24 of the lens holder 20.

According to the present embodiment, specifically, the space between the attachment location of the lower flange part 34 of the inner frame 21 and the female screw part 22a extends and contracts in the direction of the optical axis S in accordance with a change in atmospheric temperature. Further, the space between the attachment location of the upper flange part 33 and the lower end surface 26a of the holding frame 24 extends and contracts in the direction of the optical axis S in accordance with a change in atmospheric temperature. Note that the cylindrical part 32 of the linking frame 31 also extends and contracts in the direction of the optical axis S in accordance with a change in atmospheric temperature, however, the amount of extension and contraction is smaller than that of the inner frame 21 and the holding frame 24. The inner tube 22 of the inner frame 21 corresponds to an inside extension and contraction part, and the entire holding frame 24 corresponds to an outside extension and contraction part.

According to the imaging device 1 of the present embodiment, the lens holder 20 comprises the inner frame 21 and the holding frame 24 mutually linked by the linking frame 31, wherein the inner tube 22 of the inner frame 21 and the entire holding frame 24 distance the lens unit 10 from the image sensor 35 when the back focus of the lens unit 10 extends due to a change in atmospheric temperature, and contract so as to bring the lens unit 10 closer to the image sensor 35 when the back focus of the lens unit 10 contracts. Because changes in back focus associated with a change in atmospheric temperature are compensated by the inner frame 21 and the holding frame 24 disposed on the inside and the outside, an extension and contraction amount is effectively secured without extending the lens holder 20 in the direction of the optical axis S.

Further, the attachment location of the lower flange part 34 on the inner frame 21 is disposed closer to the image sensor 35 than the upper flange part 33 of the holding frame 24. The attachment location of the lower flange part 34 of the inner frame 21 is the lower end part of the inner tube 22 and the attachment location of the upper flange part 33 of the holding frame 24 is the upper end part of the outer tube 25. This allows an extension and contraction amount to be more effectively secured.

Because the thermal expansion coefficient of the linking frame 31 is smaller than the thermal expansion coefficient of the inner frame 21 and the holding frame 24, there can be effectively suppressed cancellation of the extension and contraction amount of the inner frame 21 and the holding frame 24 by the extension and contraction amount of the linking frame 31 associated with a change in atmospheric temperature.

The lens holder 20 has a structure that the inner tube 22, the outer tube 25, and the linking frame 31 are concentrically disposed, and a lower-profileness of the imaging device can be achieved and a contribution can be made to a thinner instrument to be installed on.

When the lens holder 20 satisfies the following expression (A), the extension and contraction amount of the lens holder becomes close to a change amount of the back focus, and a change in back focus is effectively compensated thereby.

$$0.5 \leq \{(a1 \times L1 - a2 \times L2 + a3 \times L3) \times \Delta T\} / \Delta Bf \leq 1.5 \quad \text{(A)}$$

Where
α1: a thermal expansion coefficient of a holding frame 24
α2: a thermal expansion coefficient of a linking frame 31
α3: a thermal expansion coefficient of an inner frame 21
L1: a distance in a direction of an optical axis from an attachment location of an upper flange part 33 to a lower end surface 26a of a holding frame 24
L2: a distance in a direction of an optical axis from an upper flange part 33 to a lower flange part 34 of a linking frame 31
L3: a distance in a direction of an optical axis from an attachment location of a lower flange part 34 to a female screw part 22a of an inner frame 21
ΔT: a change amount in atmospheric temperature
ΔBf: a change amount in back focus per a change amount in atmospheric temperature Second Embodiment FIG. 3 shows an imaging device 2 (a left half part of a sectional view) according to a second embodiment of the present invention. In the second embodiment, parts having the same function as in the first embodiment are given the same symbols, and descriptions for duplicate parts are omitted, and only different parts are described.

In the imaging device 1 of the first embodiment, there is shown a configuration example having a lens holder 20 with a three-layer structure. In the imaging device 2 of the second embodiment, a configuration example having a lens holder 20A with a five-layer structure is shown.

As shown in FIG. 3, the imaging device 2 of the present embodiment comprises a lens unit 10, a lens assembly 6 having the lens holder 20A, and a substrate 36 on which an image sensor 35 is mounted.

The lens holder 20A comprises an inner frame 21 as an inner part, a middle frame 27 as a middle part, a holding frame 24 as an outer part, a first linking frame 41 as a first linking part, and a second linking frame 45 as a second linking part.

The middle frame 27 is disposed between the inner tube 22 of the inner frame 21 and the outer tube 25 of the holding frame 24, and comprises a cylindrical middle tube 28.

The first linking frame 41 is disposed between the outer tube 25 of the holding frame 24 and the middle tube 28 of the middle frame 27, and comprises a cylindrical part 42, an upper flange part 43, and a lower flange part 44 as one body. The cylindrical part 42 is formed in a cylindrical shape, and is disposed on the same axis as the optical axis S of the lens unit 10. The upper flange part 43 is linked so as to extend outwardly from the upper end peripheral edge of the cylindrical part 42, and is buried and attached to an inner peripheral surface at the upper end part of the outer tube 25 as one body by using an appropriate method, such as insert molding. The lower flange part 44 is linked such so as to extend inwardly from the lower end peripheral edge of the cylindrical part 42, and is buried and attached to an outer peripheral surface at the upper end part of the middle tube 28 as one body by using an appropriate method, such as insert molding. The first linking frame 41 is thereby linked to the outer tube 25 and the middle tube 28 as one body.

The second linking frame 45 is disposed between the inner tube 22 of the inner frame 21 and the middle tube 28 of the middle frame 27, and comprises a cylindrical part 46, an upper flange part 47, and a lower flange part 48 as one body. The cylindrical part 46 is formed in a cylindrical shape, and is disposed on the same axis as the optical axis S of the lens unit 10. The upper flange part 47 is linked so as to extend outwardly from the upper end peripheral edge of the cylindrical part 46, and is buried and attached to the inner peripheral surface of the upper end part of the middle tube 28 as one body by using an appropriate method, such as insert molding. The lower flange part 48 is linked so as to extend inwardly from the lower end peripheral edge of the cylindrical part 46, and is buried and attached to the outer peripheral surface of the lower end part of the inner tube 22 as one body by using an appropriate method, such as insert molding. The second linking frame 45 is thereby linked to the inner tube 22 and the middle tube 28 as one body.

In the present embodiment, in order from the inside to the outside, there are concentrically disposed the inner tube 22 of the inner frame 21, the cylindrical part 46 of the second linking frame 45, the middle tube 28 of the middle frame 27, the cylindrical part 42 of the first linking frame 41, and the outer tube 25 of the holding frame 24, and the lens holder 20A has a five-layered structure.

The inner frame 21 holds the lens unit 10 by screwing into the female screw part 22a of the inner tube 22, and the lower end surface 26a of the holding frame 24 linked to the inner frame 21 by the first linking frame 41, the middle frame 27, and the second linking frame 45 is fixed to the substrate 36. The lens unit 10 held by the inner frame 21 is thereby positioned and held so as to face the image sensor 35.

The inner frame 21, the middle frame 27, and the holding frame 24 described above are formed by using a resin material, and the first linking frame 41 and the second linking frame 45 are formed by using a metal material having a smaller thermal expansion coefficient than the thermal expansion coefficient of the resin material. When the atmospheric temperature changes, the inner frame 21, the middle frame 27, and the holding frame 24 greatly extend and contract in the direction of the optical axis S in comparison with the first linking frame 41 and the second linking frame 45. According to the present embodiment, a polycarbonate resin such as Panlite™ is used as a resin material, and an aluminum alloy (aluminum bronze) is used as a metal material.

In the imaging device 2 described above, the back focus of the lens unit 10 extends when the atmospheric temperature increases, at this time, the inner frame 21, the middle frame 27, and the holding frame 24 that are mutually linked by the first linking frame 41 and the second linking frame 45 extend in the direction of the optical axis S respectively, and distance the lens unit 10 from the image sensor 35. Further, in the imaging device 2, the back focus of the lens unit 10 contracts when the atmospheric temperature decreases, at this time, the inner frame 21, the middle frame 27, and the holding frame 24 contract in the direction of the optical axis S respectively, and brings the lens unit 10 closer to the image sensor 35. That is, the imaging device 2 can cancel a change in the back focus of the lens unit 10 associated with a change in atmospheric temperature by extension and contraction of the inner frame 21, the middle frame 27, and the holding frame 24 of the lens holder 20A.

According to the present embodiment, specifically, the space between the attachment location of the lower flange part 48 and the female screw part 22a of the inner frame 21 extends and contracts in the direction of the optical axis S in accordance with a change in atmospheric temperature. Further, the space between the attachment location of the upper flange part 43 and the lower end surface 26a of the holding frame 24 extends and contracts in the direction of the optical axis S in accordance with a change in atmospheric temperature. Further, the space between the attachment location of the lower flange part 44 and the attachment location of the upper flange part 47 of the middle frame 27 extends and contracts in the direction of the optical axis S in accordance with a change in atmospheric temperature. Note that the cylindrical part 42 of the first linking frame 41 and the cylindrical part 46 of the first linking frame 45 also extends and contracts in the direction of the optical axis S in accordance with a change in atmospheric temperature, however the amount of extension and contraction is smaller than that of the inner frame 21, the middle frame 27, and the holding frame 24. The inner tube 22 corresponds to an inside extension and contraction part, the middle tube 28 corresponds to a middle extension and contraction part, and the entire holding frame 24 corresponds to an outside extension and contraction part.

According to the imaging device 2 of the present embodiment, the lens holder 20A comprises the inner frame 21, the middle frame 27, and the holding frame 24 mutually linked by the first linking frame 41 and the second linking frame 45, wherein the inner tube 22 of the inner frame 21, the middle tube 28 of the middle frame 27, and the entire holding frame 24 distance the lens unit 10 from the image sensor 35 when the back focus of the lens unit 10 extends due to a change in atmospheric temperature, and contract so as to bring the lens unit 10 closer to the image sensor 35 when the back focus of the lens unit 10 contracts. Because changes in back focus associated with a change in atmospheric temperature are compensated by the inner frame 21, the middle frame 27, and the holding frame 24 disposed on the inside, middle, and the outside respectively, an extension and contraction amount is effectively secured without extending the lens holder 20A in the direction of the optical axis S.

Further, the attachment location of the lower flange part 48 of the second linking frame 45 on the inner frame 21 is disposed closer to the image sensor 35 than the upper flange part 47 of the second linking frame 45 on the middle frame 27, and the attachment location of the lower flange part 44 of the first linking frame 41 on the middle frame 27 is disposed closer to the image sensor 35 than the attachment location of the upper flange part 43 of the first linking frame 41 on the holding frame 24. Further, the attachment location of the lower flange part 48 of the second linking frame 45 on the inner frame 21 is the lower end part of the inner tube 22, the attachment location of the upper flange part 47 of the second linking frame 45 on the middle frame 27 is the upper end part of the middle tube 28, the attachment location of the lower flange part 44 of the first linking frame 41 on the middle frame 27 is the lower end part of the middle tube 28, and the attachment location of the upper flange part 43 of the first linking frame 41 on the holding frame 24 is the upper end part of the outer tube 25. This allows an extension and contraction amount to be more effectively secured.

Because the thermal expansion coefficient of the first linking frame 41 and the second linking frame 45 is smaller than the thermal expansion coefficient of the inner frame 21, the middle frame 27, and the holding frame 24, there can be effectively suppressed cancellation of the extension and contraction amount of the inner frame 21, the middle frame 27 and the holding frame 24 by the extension and contraction amount of the first linking frame 41 and the second linking frame 45 associated with a change in atmospheric temperature.

When the lens holder 20 satisfies the following conditional expression (B), the extension and contraction amount of the lens holder becomes close to a change amount of the back focus, and a change in back focus is effectively compensated thereby.

$$0.5 \leq \{(a1 \times L1 - a2 \times L2 + a3 \times L3 - a4 \times L4 + a5 \times L5) \times \Delta T\}/\Delta Bf \leq 1.5 \qquad (B)$$

Figure 5:
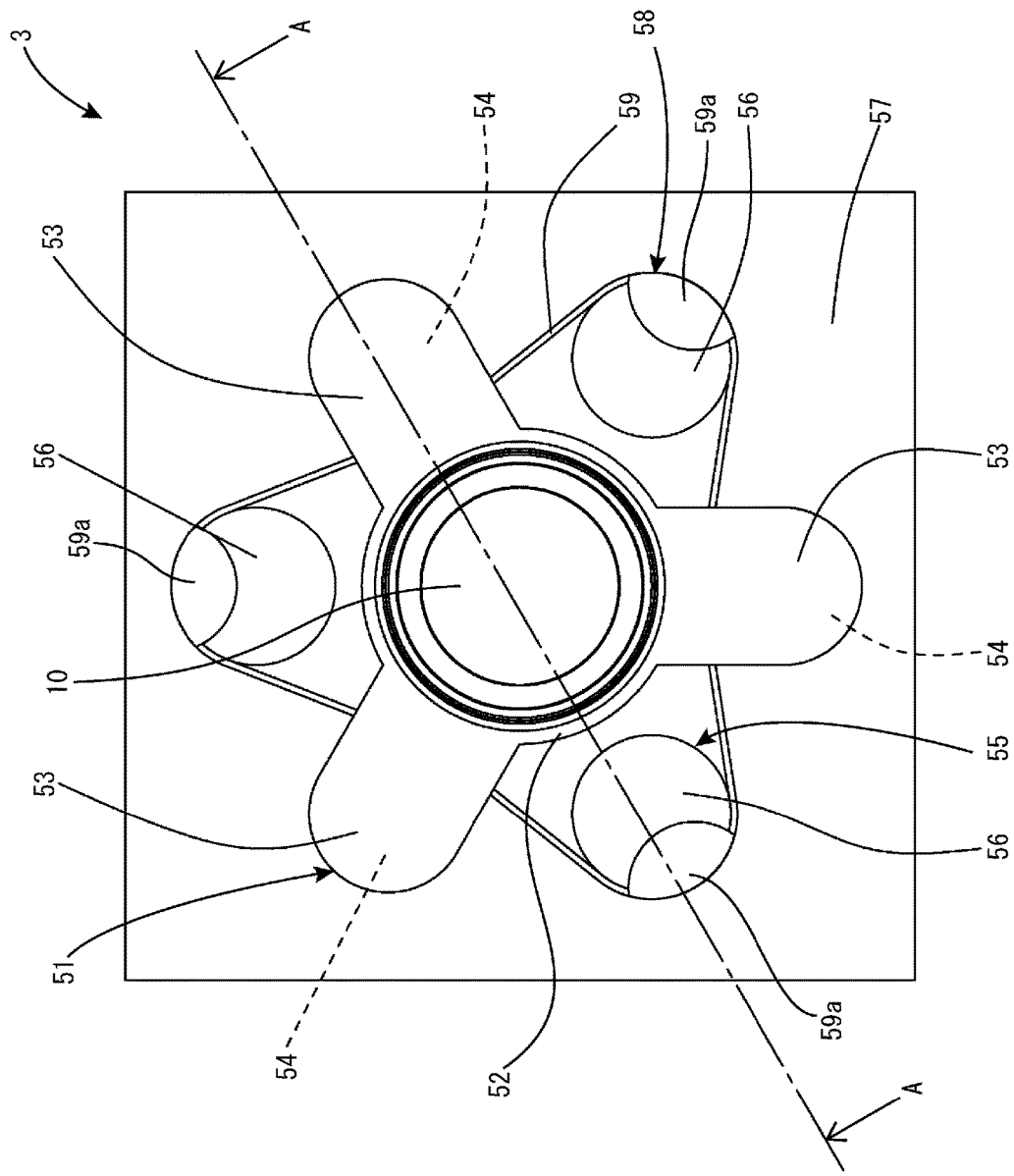
FIG. 5 is a plan view showing an imaging device of FIG. 4.
Figure 6:
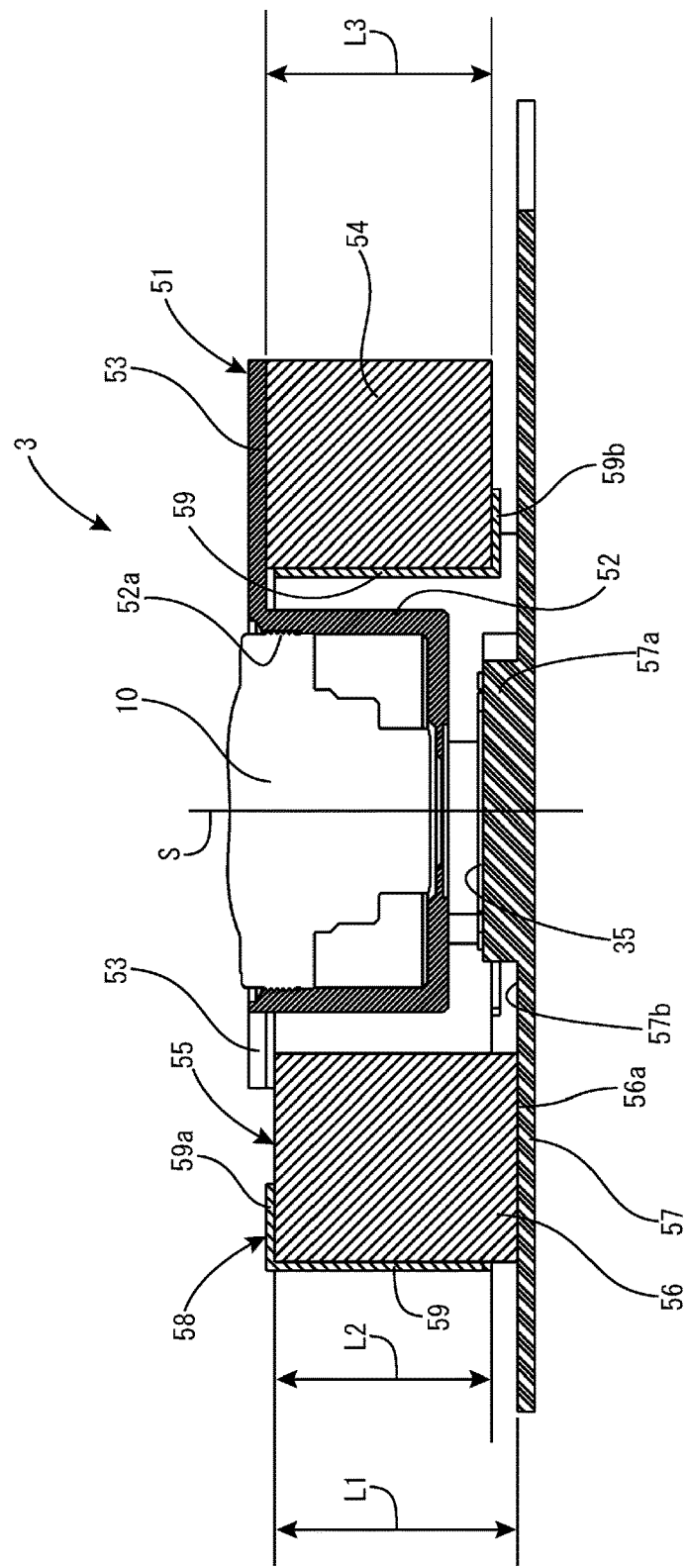
FIG. 6 is a sectional view taken along the line A-A of FIG. 5.

Where
a1: a thermal expansion coefficient of a holding frame 24
a2: a thermal expansion coefficient of a first linking frame 41
a3: a thermal expansion coefficient of a middle frame 27
a4: a thermal expansion coefficient of a second linking frame 45
a5: a thermal expansion coefficient of an inner frame 21
L1: a distance in a direction of an optical axis from an attachment location of an upper flange part 43 of a first linking frame 41 to a lower end surface 26*a* of a holding frame 24
L2: a distance in a direction of an optical axis from an upper flange part 43 to a lower flange part 44 of a first linking frame 41
L3: a distance in a direction of an optical axis from an attachment location of a lower flange part 44 of the first linking frame 41 to a upper flange part 47 of the second linking frame 45 of the middle frame 27
L4: a distance in a direction of an optical axis from an upper flange part 47 to a lower flange part 48 of the second linking frame 45
L5: a distance in a direction of an optical axis from the lower flange part 48 of the second linking frame 45 to the female screw part 22*a* of the inner frame 21
ΔT: a change amount in atmospheric temperature
ΔBf: a change amount in back focus per a change amount in atmospheric temperature Third Embodiment FIG. 4 to FIG. 6 shows an imaging device 3 according to a third embodiment of the present invention. In the third embodiment, parts having the same function as in the first and second embodiments are given the same symbol, and descriptions for duplicate parts are omitted, and only different parts are described.

In the first and the second embodiments, there are shown configuration examples having a lens holder 20 and a lens holder 20A with a concentric multi-layer structure. In the third embodiment, a configuration example having a plurality of supports is shown.

The imaging device 3 of the present embodiment comprises a lens assembly 7 having a lens unit 10 and a lens holder 50 for holding the lens unit 10, and a flat substrate 57, on which an image sensor 35 is mounted on a central protruding part 57*b* (FIG. 6) on an upper face 57*a*.

The lens holder 50 comprises an inner part 51, an outer part 55, and a linking part 58.

The inner part 51 comprises as one body, a tube-shaped inner frame 52 for holding the lens unit 10, three flange-shaped fixed plates 53 that curve outwardly from the upper end part of the inner frame 52, and three column-shaped resin holder supports 54 which the upper end face of the same is fixed to the lower face of the three fixed plates 53. The inner frame 52 has the same configuration as the inner frame 21 of the first embodiment, and a female screw part 52*a* into which the lens unit 10 is screwed is formed on the upper end part.

The outer part 55 has three column-shaped resin supports 56. The lower end surface 56*a* of each support 56 is fixed to the upper surface 57*a* of the substrate 57. The three holder supports 54 and the three supports 56 are disposed alternating with an interval of 60° from the direction of an optical axis S (the direction orthogonal to the plane of the paper in FIG. 5) of the lens unit 10.

The linking part 58 is configured of a thin metal material, and comprises a linking frame 59 for linking the three holder supports 54 and the three supports 56. The linking frame 59 is formed as a triangular ring shape in a planar view as shown in FIG. 5. The linking frame 59 is disposed so that the inner peripheral surface of the three angled portions aligns with the outer peripheral surface of the three supports 56, and is also disposed so that the outer peripheral surface of the three side portions each align with the outer peripheral surface of the three holder supports 54. The linking frame 59 is not fixed to the outer peripheral surface of each support 56 nor the outer peripheral surface of each holder support 54. There is not prevented by the linking frame 59 extension and contraction of each support 56 and each holder support 54 associated with a change in atmospheric temperature.

As shown in FIG. 6, the linking frame 59 comprises upper end curved parts 59*a* provided on the three angled portions, which are fixed on the upper end surface of each supports 56 in a stacked state, and also comprises lower end curved parts 59*b* provided on the three side portions, which are fixed on the lower end surface of each holder support 54 in a stacked state. The height of the linked frame 59 (the length from the upper end curved parts 59*a* to the lower end curved parts 59*b*) is made smaller than the length of the supports 56. By linking each support 56 and each holder support 54 via the linking frame 59, the inner part 51 is supported in a state of slightly floating above the upper surface 57*a* of the substrate 57. The linking part 58 links the inner part 51 and the outer part 55.

The inner part 51 holds the lens unit 10 by screwing into the female screw part 52*a* of the inner frame 52, and the lower end surface 56*a* of the three supports 56 of the outer part 55 linked to the inner part 51 by the linking part 58 is fixed to the upper surface 57*a* of the substrate 57. The lens unit 10 held by the inner part 51 is thereby positioned and held so as to face the image sensor 35.

Each holder support 54 of the inner part 51 and each support 56 of the outer part 55 described above are formed by using a resin material, the linking frame 59 of the linking part 58 is formed by using a metal material having a smaller thermal expansion coefficient than the thermal expansion coefficient of the resin material. When the atmospheric temperature changes, each holder support 54 and each support 56 greatly extend and contract in the direction of the optical axis S in comparison with the linking frame 59. According to the present embodiment, polyacetal resin (POM) is used as a resin material, and an aluminum alloy (aluminum bronze) is used as a metal material.

In the imaging device 3 described above, the back focus of the lens unit 10 extends when the atmospheric temperature increases; at this time, each holder support 54 and each support 56 which are mutually linked by the linking frame 59 extends in the direction of the optical axis S respectively, and distances the lens unit 10 from the image sensor 35. Further, in the imaging device 3, the back focus of the lens unit 10 contracts when the atmospheric temperature decreases, at this time, each holder support 54 and each support 56 contracts in the direction of the optical axis S respectively, and brings the lens unit 10 closer to the image sensor 35. That is, the imaging device 3 can cancel a change in the back focus of the lens unit 10 associated with a change in atmospheric temperature by extension and contraction of each holder support 54 and each support 56 of the lens holder 50.

According to the present embodiment, each holder support 54 and each support 56 extends and contracts in the direction of the optical axis S associated with a change in atmospheric temperature. At this time, the linking frame 59 also extends and contracts in the direction of the optical axis S in accordance with a change in atmospheric temperature, but the extension and contraction amount is smaller than that of each holder support 54 and each support 56. Each holder support 54 corresponds to an inside extension and contraction part, and each support 56 corresponds to an outside extension and contraction part.

According to the imaging device 3 of the present embodiment, the lens holder 50 comprises the inner part 51 and the outer part 55 mutually linked by the linking part 58, wherein each holder support 54 of the inner part 51 and each support 56 of the outer part 55 distance the lens unit 10 from the image sensor 35 when the back focus of the lens unit 10 extends due to a change in atmospheric temperature, and contract so as to bring the lens unit 10 closer to the image sensor 35 when the back focus of the lens unit 10 contracts. Because changes in back focus due to a change in atmospheric temperature are compensated by each holder support 54 and each support 56 disposed on the inside and the outside, an extension and contraction amount is effectively secured without extending the lens holder 50 in the direction of the optical axis S.

Further, the attachment location of the lower end curved part 59b of the linking part 58 on the inner part 51 is disposed closer to the image sensor 35 than the attachment location of the upper end curved part 59a of the linking part 58 on the outer part 55. The attachment location of the lower end curved part 59b of the linking part 58 on the inner part 51 is the lower end surface of the holder support 54, and the attachment location of each upper end curved part 59a of the linking part 58 on the outer part 55 is the upper end surface of the support 56. This allows an extension and contraction amount to be more effectively secured.

Further, because the thermal expansion coefficient of the linking frame 59 is smaller than the thermal expansion coefficient of each holder support 54 and each support 56, there can be effectively suppressed cancellation of the extension and contraction amount of each holder support 54 and each support 56 by the extension and contraction amount associated with a change in atmospheric temperature of the linking frame 59.

Further, the lens unit 10 can be more stably held by the three supports 56, and obtain a sturdy structure. Because the inner part 51, the outer part 55, and the linking part 58 that configure the lens holder 50 are each disposed next to each other in the direction orthogonal to the optical axis S, a low-profileness of the imaging device 3 can be achieved.

When the lens holder 50 satisfies the following expression (A), the extension and contraction amount of the lens holder becomes close to a change amount of the back focus, and a change in back focus is effectively compensated thereby.

$$0.5 \leq \{(a1 \times L1 - a2 \times L2 + a3 \times L3) \times \Delta T\}/\Delta Bf \leq 1.5 \quad (A)$$

Where
a1: a thermal expansion coefficient of each support 56
a2: a thermal expansion coefficient of a linking frame 59
a3: a thermal expansion coefficient of each holder support 54
L1: a height of each support 56
L2: a height of the linking frame 59
L3: a height of each holder support 54
ΔT: a change amount in atmospheric temperature
ΔBf: a change amount in back focus per a change amount in atmospheric temperature The first embodiment to the third embodiment of the present invention have been described above, but the present invention is not limited to these embodiments, and a variety of changes may be available within the scope of the meaning of the present invention.

For example, in the first embodiment and the second embodiment, an example is illustrated wherein the lens holder is a three-layer structure and a five-layer structure, but the lens holder may be a seven-layer structure or more. When the lens holder has a seven-layer structure or more, a plurality of middle tubes (a first middle tube and a second middle tube, or a first middle tube, a second middle tube, and a third middle tube) may exist between the outer tube and the inner tube, and the outer tube, the plurality of middle tubes, and the inner tube may be linked by a linking frame (a first linking frame and a second linking frame, and one or a plurality of third linking frames that link the middle tubes to each other) as described above. Further, the imaging device of the above embodiments is, for example, suitable for a vehicle-mounted camera employed as a drive recorder by combining with a semiconductor recording device for recording images obtained by the imaging device. Other than such vehicle-mounted cameras, the imaging device is also suitable for a surveillance camera by combining with a transmission device for transmitting images obtained by the imaging device to a remote location. The imaging device can also be suitable for a variety of instruments, such as cellular devices and PDAs.

Further, in the first embodiment and the like described above, the attachment location of the lower flange part 34 of the inner frame 21 is disposed closer to the image sensor 35 than is the attachment location of the upper flange part 33 of the holding frame 24, but is not limited thereto. For example, when a material for the inner frame 21 and the holding frame 24 has a negative thermal expansion coefficient (that is, a material that contracts when temperature increases and extends when temperature decreases) is used, the configuration becomes opposite to that of the first embodiment, wherein the attachment location of the lower flange part 34 of the inner frame 21 is disposed away farther from the image sensor 35 in comparison with the attachment location of the upper flange part 33 of the holding frame 24.

Embodiments of the present invention are described above, but the present invention is not limited to these embodiments. To the extent that the intent of the present invention is provided, additions, deletions, and design changes to the embodiments described heretofore as well as combinations of characteristics of the embodiments are included in the scope of the present invention.

(Evaluation of First Embodiment to Third Embodiment According to the Present Invention and Comparative Examples 1 and 2)

The function of compensating for changes in back focus was evaluated for Examples 1 to 3 according to the embodiments, and Comparative Examples 1 and 2 according to a conventional imaging device.

First, the configuration of Examples 1 to 3 and Comparative Examples 1 and 2 used for evaluation are described.

Example 1

In Example 1, an imaging device 1 according to the first embodiment described above comprises a lens unit 10 containing an optical system shown in Table 1 below.

Regarding Modulation Transfer Function (MTF) of Table 1, S denotes sagittal side, T denotes tangential side, and each value denotes the contrast value (%) for a 120 LP/mm resolution. The focal length f of the overall optical system of the lens unit 10 is 1.66 mm. Further, the lens holder 20 of example 1 has the configuration shown in Table 2. As shown in Table 2, the inner frame 21 and the outer frame 24 are formed from Panlite™ as the material, wherein the thermal expansion coefficient α1 and the thermal expansion coefficient α3 are $70 \times 10^{-6}/°$ C. The linking frame 31 is formed from aluminum bronze as the material, wherein the thermal expansion coefficient α2 is $16.5 \times 10^{-6}/°$ C. The distance L1 in the direction of the optical axis from the attachment location of the upper flange part 33 to the lower end surface 26a of the holding frame 24 is 5.2 mm, the distance L2 in the direction of the optical axis from the upper flange part 33 to the lower flange part 34 on the linking frame 31 (that is, the height of the cylindrical part 32) is 4.8 mm, and the distance L3 in the direction of the optical axis from the attachment location of the lower flange part 34 to the female screw part 22a (that is, the upper end part of the cylindrical part 22) on the inner frame 21 is 4.8 mm.

TABLE 1

| Field Angle (degree) | | |
|---|---|---|
| horizontal (H) | vertical (V) | diagonal (D) |
| 134 | 98 | 170 |

| MTF (%) | | |
|---|---|---|
| Central | Image Height 70% (S/T) | Image Height 90% (S/T) |
| 69 | 58/48 | 46/31 |

TABLE 2

| Part | Material | thermal expansion coefficient (/° C.) | Length of extension and contraction part |
|---|---|---|---|
| Ourter frame 24 | Panlite | α1 = 70 × 10⁻⁶ | L1 = 5.2 |
| Linking frame 31 | aluminum bronze | α2 = 16.5 × 10⁻⁶ | L2 = 4.8 |
| Inner frame 21 | Panlite | α3 = 70 × 10⁻⁶ | L3 = 4.8 |

Example 2

In Example 2, the imaging device 2 according to the second embodiment described above comprises a lens unit 10 containing an optical system shown in Table 1 above. Further, the lens holder 20A of Example 2 has a configuration shown in Table 3. As shown in Table 3, the inner frame 21, the middle frame 27, and the outer frame 24 are formed from Panlite™ as the material, wherein the thermal expansion coefficient α1, the thermal expansion coefficient α3, and the thermal expansion coefficient α5 are $70 \times 10^{-6}/°$ C., and the first linking frame 41 and the second linking frame 45 are formed from aluminum bronze as the material, wherein the thermal expansion coefficient α2 and the thermal expansion coefficient α4 are $16.5 \times 10^{-6}/°$ C. The distance L1 in the direction of the optical axis from the attachment location of the upper flange part 43 of the first linking part 41 to the lower end surface 26a on the holding frame 24 is 5.3 mm, the distance L2 in the direction of the optical axis from the upper flange part 43 to the lower flange part 44 on the first linking frame 41 (that is, the height of the cylindrical part 42) is 4.8 mm, the distance L3 in the direction of the optical axis from the attachment location of the lower flange part 44 of the first linking frame 41 to the upper flange part 47 of the second linking frame 45 on the middle frame 27 is 4.8 mm, the distance L4 in the direction of the optical axis from the upper flange part 47 to the lower flange part 48 on the second linking frame 45 (that is, the height of the cylindrical part 62) is 4.8 mm, and the distance L5 in the direction of the optical axis from the lower flange part 48 of the second linking frame 45 to the female screw part 22a (that is, the upper end part of the inner tube 22) on the inner frame 21 is 4.8 mm.

TABLE 3

| Part | Material | thermal expansion coefficient (/° C.) | Length of extension and contraction part (mm) |
|---|---|---|---|
| Ourter frame 24 | Panlite | α1 = 70 × 10⁻⁶ | L1 = 5.2 |
| First Linking frame 41 | aluminum bronze | α2 = 16.5 × 10⁻⁶ | L2 = 4.8 |
| Middle frame 27 | Panlite | α3 = 70 × 10⁻⁶ | L3 = 4.8 |
| Second linking frame 45 | aluminum bronze | α4 = 16.5 × 10⁻⁶ | L4 = 4.8 |
| Inner frame 21 | Panlite | α5 = 70 × 10⁻⁶ | L5 = 4.8 |

Example 3

In Example 3, the imaging device 3 according to the third embodiment described above comprises a lens unit 10 containing an optical system shown in Table 1 above. Further, the lens holder 50 of example 3 has a configuration shown in Table 4. As shown in Table 4, each support 56 and each holder support 54 is formed from POM as the material, wherein the thermal expansion coefficient α1 and the thermal expansion coefficient α3 are $110 \times 10^{-6}/°$ C., and the linking frame 59 is formed from aluminum bronze as the material, wherein the thermal expansion coefficient α2 is $16.5 \times 10^{-6}/°$ C. The height L1 of each support 56 is 5.0 mm, the distance L2 from the upper end curved part 59a to the lower end curved part 59b on the linking frame 59 (that is, the height of the linking frame 59) is 4.8 mm, and the height L3 of each holder support is 4.6 mm.

TABLE 4

| Part | Material | thermal expansion coefficient (/° C.) | Length of extension and contraction part (mm) |
|---|---|---|---|
| Support 56 | POM | α1 = 113 × 10⁻⁶ | L1 = 5.0 |
| Linking frame 59 | aluminum bronze | α2 = 16.5 × 10⁻⁶ | L2 = 4.8 |
| Holder support 54 | POM | α3 = 113 × 10⁻⁶ | L3 = 4.8 |

Comparative Example 1

Figure 7:
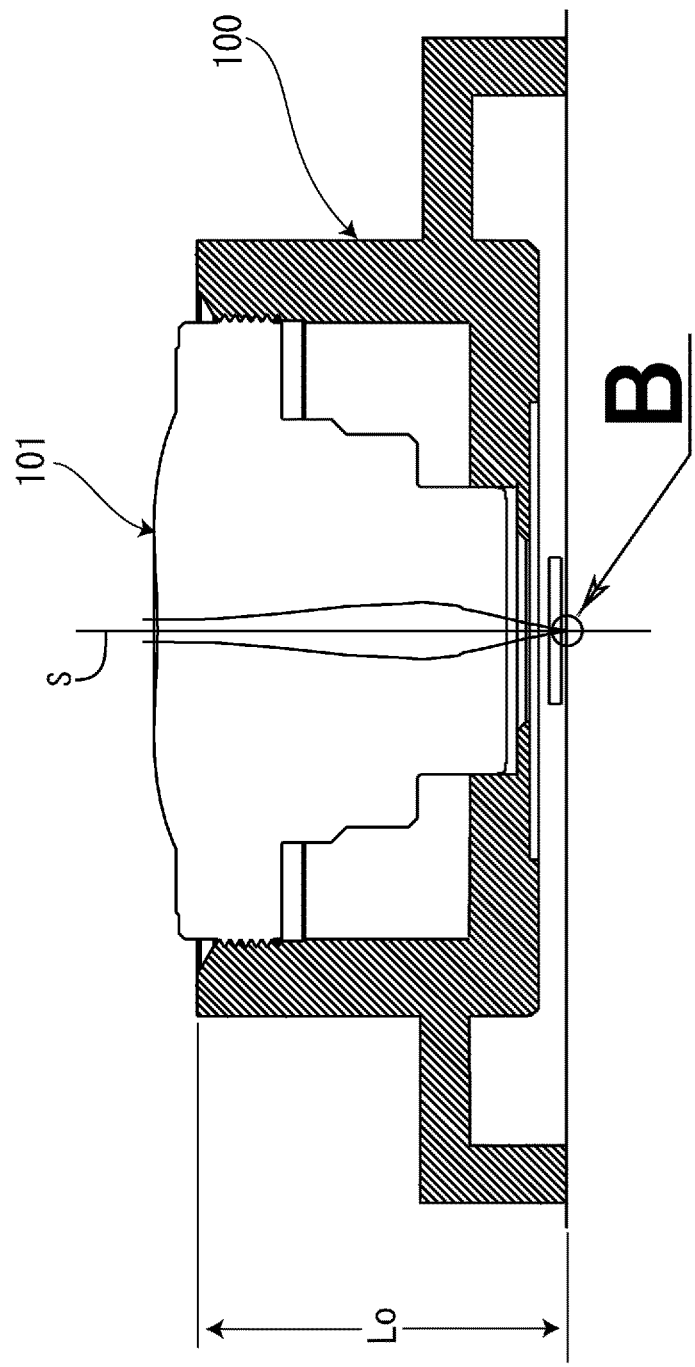
FIG. 7 is a sectional view showing a conventional imaging device.

In Comparative Example 1, a conventional imaging device as shown in FIG. 7 comprises a lens unit 101 containing an optical system shown in Table 1 above and a lens holder 100. The lens holder 100 is formed from an aluminum material having thermal expansion coefficient α of $23.9 \times 10^{-6}/°$ C. The overall length of the lens holder 100 (the length in the direction of the optical axis of the lens unit 101) Lo is 5 mm.

Comparative Example 2

Comparative Example 2 has the same configuration as comparative example 1 except for having a lens holder 100 formed from Panlite™ as the material instead of an aluminum material, having a thermal expansion coefficient α of $70 \times 10^{-6}/°$ C.

(Description of Evaluation Method)

The description will be made of a method for evaluating the function of compensating for changes in back focus of the lens unit 10 and the lens unit 101 used in Examples 1 to 3 and Comparative Examples 1 and 2.

As for a background of the evaluation, an imaging device is, for example, used for a vehicle-mounted camera installed in a drive recorder of a car, and such an imaging device should work in a harsh environment where the car interior temperature becomes very hot due to the blazing sun of the midsummer and very cold as the outdoor temperature of a cold district in the midwinter. As such, the working temperature range required for the imaging device is, for example, a range from $-40°$ C. to $+80°$ C., and the refractive index of a lens in the lens unit of the imaging device changes as it is impacted by changes in atmospheric temperature. When the refractive index of a lens changes, the back focus of the optical system also changes, and, image quality in imaging devices is deteriorated due to a change in back focus associated with a change in atmospheric temperature.

This will be described by using the conventional imaging device shown in FIG. 7 and the expanded view in the vicinity of an image sensor shown in FIGS. 8A and 8B. In FIGS. 8A and 8B, the horizontal lines in the circle represent the imaging surface of the image sensor, and a focus state is realized when the front end of the light beam shown as a wedge shape unites with the imaging surface. Further, as for the back focus of the lens unit 101, the focal length moves downward when the atmospheric temperature increases as shown in FIG. 8A, that is, the back focus extends. When the atmospheric temperature decreases, the focal length moves upward as shown in FIG. 8B, that is, the back focus contracts. Such a change in back focus occurs in the same manner in the lens unit 10 of the imaging device 1 of the embodiments described above.

Figure 9:
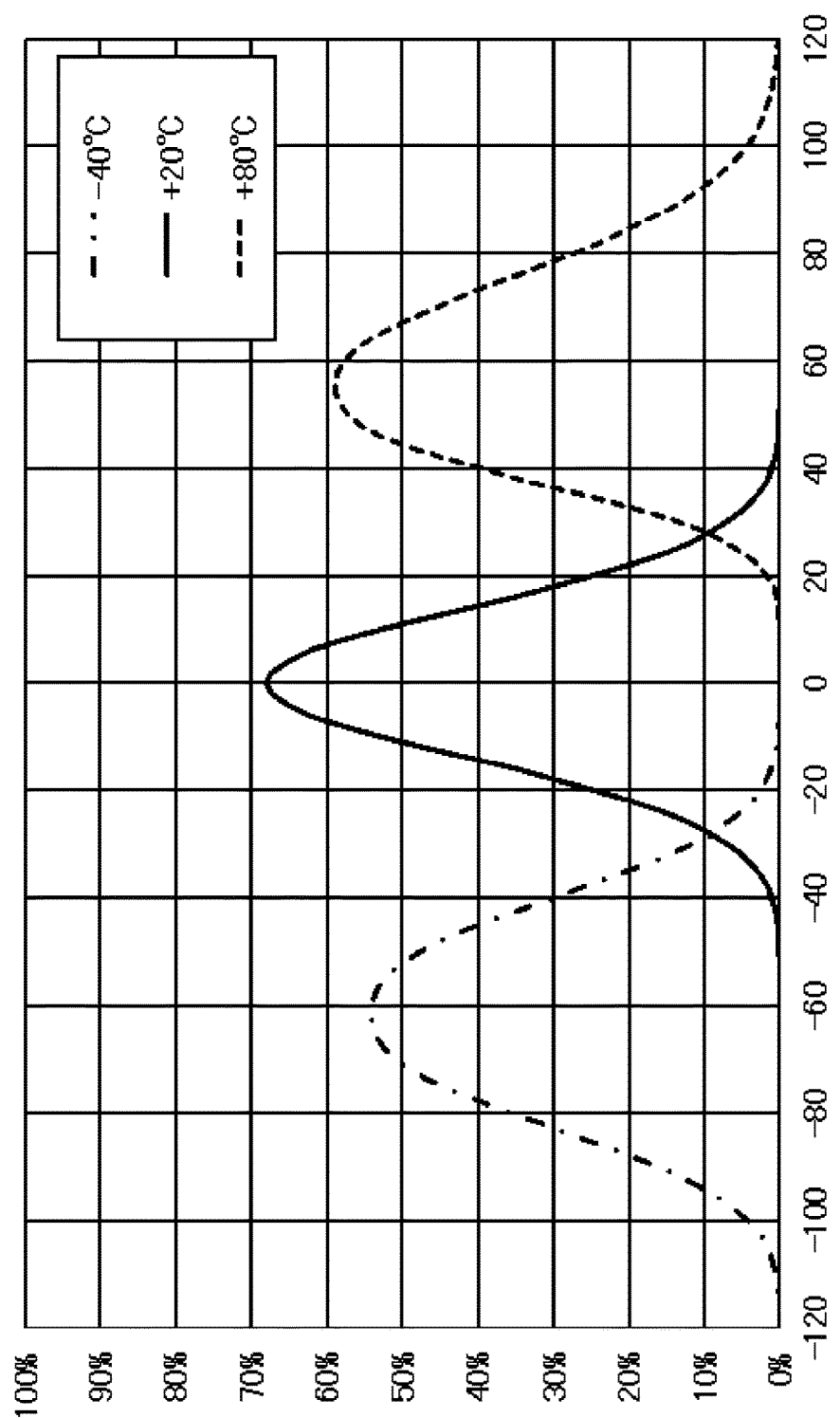
FIG. 9 is a chart showing MTF curve of a lens unit.

Further, the MTF peak of the lens unit 101 changes associated with the change in back focus. This is shown in FIG. 9. In FIG. 9, the horizontal axis denotes image formation position (μm), and the vertical axis denotes the contrast value (%) of MTF in 120 LP/mm.

In FIG. 9, the peak value of contrast becomes 69% when the image formation position 0 μm at 20° C. (room temperature) is the reference. From this state, the MTF peak value moves approximately 56 μm to the positive side when the atmospheric temperature changes to +80° C., and the MTF peak value moves approximately 62 μm to the negative side when the atmospheric temperature changes to −40° C. That is, the MTF peak value moves approximately ±60 μm relative associated with a change in atmospheric temperature of ±60° C. The change amount of the peak value is thought to correspond to the change amount of back focus in the lens unit 101 due to a change in the refractive index of the lens associated with a change in atmospheric temperature.

From FIG. 9, the lens unit 101 has an MTF peak value that changes by approximately ±60 μm relative to a temperature change of ±60° C. So for convenience, the change amount of the back focus for 1° C., $\Delta Bf/dT$, is defined as 1 μm/° C. This is the same for the lens unit 10.

For a general vehicle-mounted camera installed in a drive recorder, a resolution performance is desired such that characters on a license plate that is at a distance of at least 5 m can be read. For example, when the character width on a license plate is 12 mm, and is captured in an image from 5 m away, the image is formed with the character width on the image sensor being approximately 4 μm (corresponding to 120 LP/mm). At this time, the resolution performance (contrast) required for reading characters needs at least 20% of MTF in 120 LP/mm. That is, when considering the image formation position 0 μm, evaluation is performed wherein if the MTF curve for 20° C., −40° C., and 80° C. is 20% or greater, performance as a vehicle-mounted camera can be secured, and if less than 20%, performance is insufficient for a vehicle-mounted camera.

(Description of Evaluation Results)

The description will be made of evaluation results for Examples 1 to 3 and Comparative Examples 1 and 2.

(Evaluation of Example 1)

The description in the Embodiment 1 as below will be shown in the next paragraph.

(1) $\Delta L/dT$, the extension and contraction amount per 1° C. in the lens holder 20
(2) $\Delta Bf/dT$, the change amount of back focus per 1° C. in the lens unit 10
(3) $\Delta F/dT$, the correction error of back focus per 1° C.
(4) $\Delta F$, the correction error when the temperature changes 60° C. ($\Delta T=60°$ C.)

$$\Delta L/dT=(a1 \times L1 - a2 \times L2 + a3 \times L3)=(70 \times 10^{-6} \times 5.2 \times 10^{-3} - 16.5 \times 10^{-6} \times 4.8 \times 10^{-3} + 70 \times 10^{-6} \times 4.8 \times 10^{-3})=0.62 \text{ (μm/° C.)} \quad (1)$$

$$\Delta Bf/dT = 1 \text{ (μm/° C.)} \quad (2)$$

$$\Delta F/dT = \Delta Bf/dT - \Delta L/dT = 1 - 0.62 = 0.38 \text{ (μm/° C.)} \quad (3)$$

$$\Delta F = (\Delta F/dT) \times \Delta F = 0.38 \times 60 = 22.8 \text{ (μm)} \quad (4)$$

Figure 10:
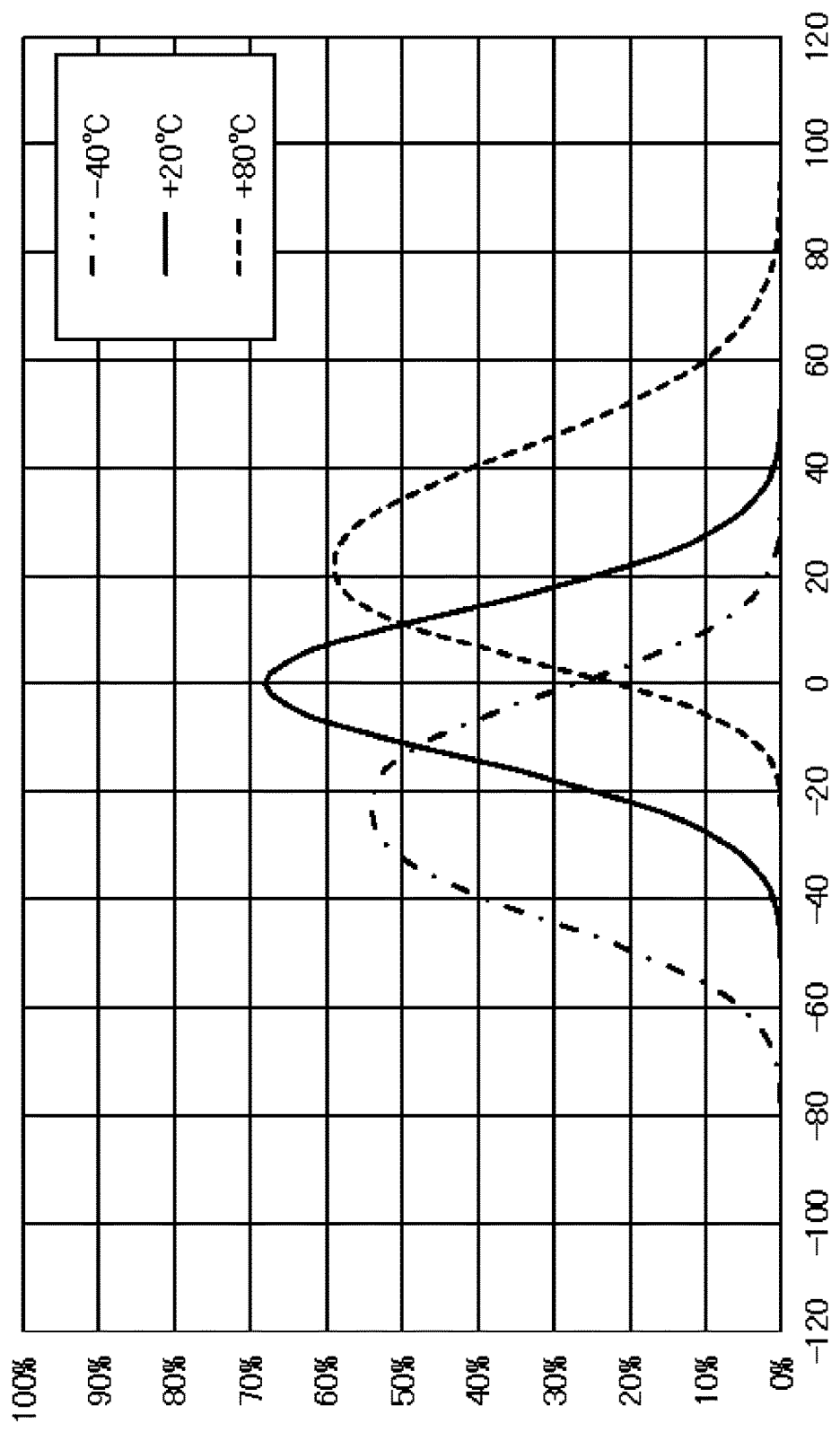
FIG. 10 is a chart showing MTF curve of the imaging device according to a first embodiment of the present invention.

The change of MTF measured for Example 1 is shown in FIG. 10. As shown in FIG. 10, the reference is defined as the image formation position 0 μm at 20° C. (room temperature). When the atmospheric temperature is changed by ±60° C., the peak value becomes approximately ±22.8 (μm), and it substantially matches the correction error $\Delta F$ shown above in (4). Further, as apparent from FIG. 10, the MTF of image formation position 0 μm is approximately 69% at 20° C., becomes approximately 25% at 80° C. and −40° C., and, 20% or greater is secured at either temperature. Thus, Example 1 can acquire a resolution performance that allows characters on a license plate 5 m away to be sufficiently read in an atmospheric temperature range of −40° C. to 80° C.

The Example 1 satisfies expression (A) (described again)

$$0.5 \leq \{(a1 \times L1 - a2 \times L2 + a3 \times L3) \times \Delta T\}/\Delta Bf \leq 1.5 \quad (A)$$

An extension and contraction amount $\Delta L$ of the lens holder 20 associated with change $\Delta T$ in the atmospheric temperature is shown as $$\Delta L=(a1 \times L1 - a2 \times L2 + a3 \times L3) \times \Delta T=(70 \times 10^{-6} \times 5.2 \times 10^{-3} - 16.5 \times 10^{-6} \times 4.8 \times 10^{-3} + 70 \times 10^{-6} \times 4.8 \times 10^{-3}) \times \Delta T = 0.62 \text{ (μm/° C.)} \times \Delta T$$

and, there is shown the change amount $\Delta Bf$ of the back focus associated with the change $\Delta T$ in atmospheric temperature, $$\Delta Bf = (\Delta Bf/dT) \times \Delta T = 1 \text{ (μm/° C.)} \times \times \Delta T$$

therefore, $$\Delta L/\Delta Bf = 0.62/1 = 0.62$$

thereby, the above expression (A) is satisfied.

(Evaluation of Example 2)

The description in the Embodiment 2 as below will be shown in the next paragraph.

(5) ΔL/dT, the extension and contraction amount per 1° C. in the lens holder 20A
(6) ΔBf/dT, the change amount of back focus per 1° C. in the lens unit 10
(7) ΔF/dT, the correction error of back focus per 1° C.
(8) ΔF, the correction error when the temperature changes 60° C. (ΔT=60° C.)

$$\Delta L/dT=(a1\times L1-a2\times L2+a3\times L3-a4\times L4+a5\times L5)=(70\times 10^{-6}\times 5.3\times 10^{-3}-16.5\times 10^{-6}\times 4.8\times 10^{-3}+70\times 10^{-6}\times 4.8\times 10^{-3}-16.5\times 10^{-6}\times 4.8\times 10^{-3}+70\times 10^{-6}\times 4.8\times 10^{-3})\times \Delta T=0.885 \ (\mu m/°C.) \quad (5)$$

$$\Delta Bf/dT=1 \ (\mu m/°C.) \quad (6)$$

$$\Delta F/dT=\Delta Bf/dT-\Delta L/dT=1-0.885=0.115 \ (\mu m/°C.) \quad (7)$$

$$\Delta F=(\Delta F/dT)\times \Delta F=0.115\times 60=6.9 \ (\mu m) \quad (8)$$

Figure 11:
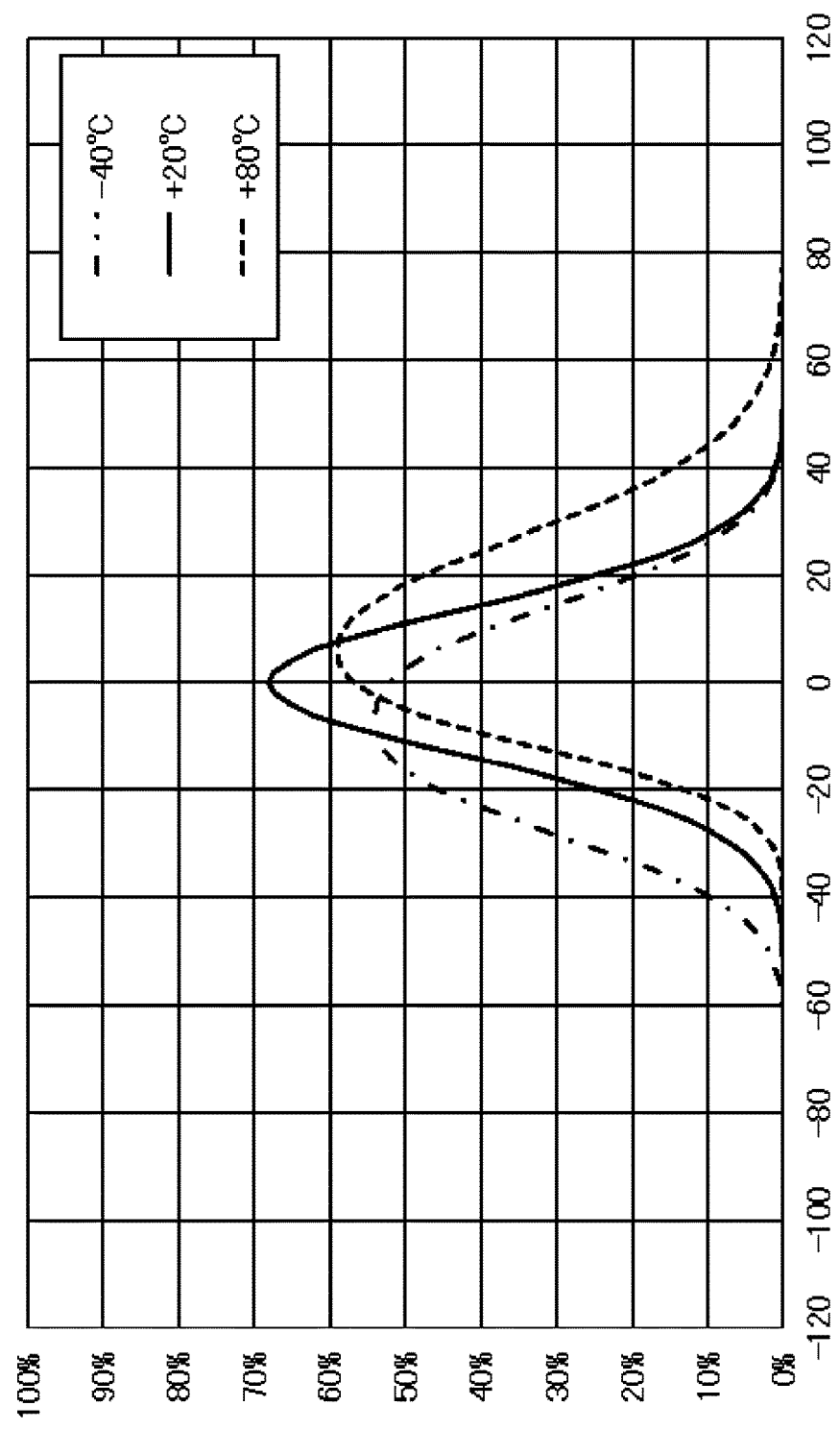
FIG. 11 is a chart showing MTF curve of the imaging device according to a second embodiment of the present invention.

The change of MTF measured for Example 2 is shown in FIG. 11. As shown in FIG. 11, the reference is defined as the image formation position 0 μm at 20° C. (room temperature). When the atmospheric temperature is changed by ±60° C., the peak value becomes approximately ±6.9 (μm), and it substantially matches the correction error ΔF shown above in (8). Further, as apparent from FIG. 11, the MTF of image formation position 0 μm is approximately 69% at 20° C., and becomes approximately 53% at 80° C. and −40° C., and 20% or greater at either temperature. Thus, Example 2 can acquire a resolution performance that allows characters on a license plate 5 m away to be sufficiently read in an atmospheric temperature range of −40° C. to 80° C.

The Example 2 satisfies expression (B) (described again)

$$0.5\leq\{(a1\times L1-a2\times L2+a3\times L3-a4\times L4+a5\times L5)\times \Delta T\}/\Delta Bf\leq 1.5 \quad (B)$$

An extension and contraction amount ΔL of the lens holder 20A associated with change ΔT in the atmospheric temperature is shown as $$\Delta L=(a1\times L1-a2\times L2+a3\times L3-a4\times L4+a5\times L5)\times \Delta T=(70\times 10^{-6}\times 5.3\times 10^{-3}-16.5\times 10^{-6}\times 4.8\times 10^{-3}+70\times 10^{-6}\times 4.8\times 10^{-3}-16.5\times 10^{-6}\times 4.8\times 10^{-3}+70\times 10^{-6}\times 4.8\times 10^{-3})\times \Delta T=0.885 \ (\mu m/°C.)\times \Delta T$$

and, there is shown the change amount ΔBf of the back focus associated with the change ΔT in atmospheric temperature, $$\Delta Bf=(\Delta Bf/dT)\times \Delta T=1 \ (\mu m/°C.)\times \Delta T$$

therefore, $$\Delta L/\Delta Bf=0.885/1=0.885$$

Thereby, the above expression (B) is satisfied.

(Evaluation of Example 3)

The description in the Embodiment 3 as below will be shown in the next paragraph.

(9) ΔL/dT, the extension and contraction amount per 1° C. in the lens holder 50
(10) ΔBf/dT, the change amount of back focus per 1° C. in the lens unit 10
(11) ΔF/dT, the correction error of back focus per 1° C.
(12) ΔF, the correction error when the temperature changes 60° C. (ΔT=60° C.)

$$\Delta L/dT=(a1\times L1-a2\times L2+a3\times L3)=(113\times 10^{-6}\times 5.0\times 10^{-3}-16.5\times 10^{-6}\times 4.8\times 10^{-3}+113\times 10^{-6}\times 4.6\times 10^{-3})=1 \ (\mu m/°C.) \quad (9)$$

$$\Delta Bf/dT=1 \ (\mu m/°C.) \quad (10)$$

$$\Delta F/dT=\Delta Bf/dT-\Delta L/dT=1-1=0 \ (\mu m/°C.) \quad (11)$$

$$\Delta F=(\Delta F/dT)\times \Delta F=0\times 60=0 \ (\mu m) \quad (12)$$

According to the evaluation of Examples 1 and 2 described above, as shown in FIG. 10 and FIG. 11, it can be understood that the peak value of the MTF curve of −40° C. and 80° C. moves in the horizontal axis direction just for the value shown for the compensation error ΔF, relative to the MTF curve of 20° C. Thus, the MTF curve of 80° C. of Example 3 is predicted to be substantially the same as the MTF curve of 80° C. in FIG. 9, where the peak value has moved to the position of 0 μm, and the MTF curve of −40° C. of Example 3 is predicted to be substantially the same as the MTF curve of −40° C. in FIG. 9, where the peak value has moved to the position of 0 μm. As such, it is predicted that an MTF at an image formation position of 0 μm can secure approximately 69% at 20° C., approximately 59% at 80° C., approximately 44% at −40° C., and 20% or greater at any of these temperatures. Thus, Example 3 can acquire a resolution performance that allows characters on a license plate 5 m away to be sufficiently read in an atmospheric temperature range of −40° C. to 80° C.

The Example 3 satisfies expression (A) (described again)

$$0.5\leq\{(a1\times L1-a2\times L2+a3\times L3)\times \Delta T\}/\Delta Bf\leq 1.5 \quad (A)$$

An extension and contraction amount ΔL of the lens holder 50 associated with change ΔT in the atmospheric temperature is shown as $$\Delta L=(a1\times L1-a2\times L2+a3\times L3)\times \Delta T=(113\times 10^{-6}\times 5.0\times 10^{-3}-16.5\times 10^{-6}\times 4.8\times 10^{-3}+113\times 10^{-6}\times 4.6\times 10^{-3})\times \Delta T=1 \ (\mu m/°C.)\times \Delta T$$

and, there is shown the change amount ΔBf of the back focus associated with the change ΔT in atmospheric temperature, $$\Delta Bf=(\Delta Bf/dT)\times \Delta T=1 \ (\mu m/°C.)\times \Delta T$$

therefore, $$\Delta L/\Delta Bf=1/1=1$$

thereby, the above expression (A) is satisfied.

(Evaluation of Comparative Example 1)

The description in the Comparative Example 1 as below will be shown in the next paragraph.

(13) ΔL/dT, the extension and contraction amount per 1° C. in the lens holder 20
(14) ΔBf/dT, the change amount of back focus per 1° C. in the lens unit 101
(15) ΔF/dT, the correction error of back focus per 1° C.
(16) ΔF, the correction error when the temperature changes 60° C. (ΔT=60° C.)

$$\Delta L/dT=(a\times Lo=23.9\times 10^{-6}\times 5\times 10^{-3}=0.12 \ (\mu m/°C.) \quad (13)$$

$$\Delta Bf/dT=1 \ (\mu m/°C.) \quad (14)$$

$$\Delta F/dT=\Delta Bf/dT-\Delta L/dT=1-0.12=0 \ 0.88 \ (\mu m/°C.) \quad (15)$$

$$\Delta F=(\Delta F/dT)\times \Delta F=0.88\times 60=52.8 \ (\mu m) \quad (16)$$

As described in Example 3 above, it is understood that the peak value of the MTF curve of −40° C. and 80° C. moves in the horizontal direction just for the value shown for the compensation error ΔF, relative to the MTF curve of 20° C. Thus, the MTF curve of 80° C. of Comparative Example 1 is predicted to be substantially the same as the MTF curve of 80° C. in FIG. 9, where the peak value has moved to the position of 52.8 μm, and the MTF curve of −40° C. of Comparative Example 1 is predicted to be substantially the same as the MTF curve of −40° C. in FIG. 9, where the peak value has moved to the position of −52.8 μm. As such, it is predicted that an MTF at an image formation position of 0 μm can secure approximately 69% at 20° C., but will become substantially 0% at 80° C. and −40° C.

When the atmospheric temperature changes substantially, an MTF of 20% or greater cannot be secured. Thus, Comparative Example 1 cannot sufficiently compensate for the change in back focus, and cannot acquire a resolution performance that allows characters on a license plate 5 m away to be sufficiently read in an atmospheric temperature range of −40° C. to 80° C.

(Evaluation of Comparative Example 2)

The description in the Comparative Example 2 as below will be shown in the next paragraph.

(17) ΔL/dT, the extension and contraction amount per 1° C. in the lens holder 20
(18) ΔBf/dT, the change amount of back focus per 1° C. in the lens unit 101
(19) ΔF/dT, the correction error of back focus per 1° C.
(20) ΔF, the correction error when the temperature changes 60° C. (ΔT=60° C.)

$$\Delta L/dT = a1 \times Lo = 70 \times 10^{-6} \times 5 \times 10^{-3} = 0.35 \ (\mu m/° C.) \quad (17)$$

$$\Delta Bf/dT = 1 \ (\mu m/° C.) \quad (18)$$

$$\Delta F/dT = \Delta Bf/dT - \Delta L/dT = 1 - 0.35 = 0\ 0.65 \ (\mu m/° C.) \quad (19)$$

$$\Delta F = (\Delta F/dT) \times \Delta F = 0.65 \times 60 = 39 \ (\mu m) \quad (20)$$

As described in Example 3 above, it is understood that the peak value of the MTF curve of −40° C. and 80° C. moves in the horizontal direction just for the value shown for the compensation error ΔF, relative to the MTF curve of 20° C. Thus, the MTF curve of 80° C. of Comparative Example 2 is predicted to be substantially the same as the MTF curve of 80° C. in FIG. 9, where the peak value has moved to the position of 39 μm, and the MTF curve of −40° C. of Comparative Example 1 is predicted to be substantially the same as the MTF curve of −40° C. in FIG. 9, where the peak value has moved to the position of −39 μm. As such, it is predicted that an MTF at an image formation position of 0 μm can secure approximately 69% at 20° C., but will become less than 5% at 80° C. and −40° C. When the atmospheric temperature changes substantially, an MTF of 20% or greater cannot be secured. Thus, Comparative Example 2 also cannot sufficiently compensate for the change in back focus, and cannot acquire a resolution performance that allows characters on a license plate 5 m away to be sufficiently read in an atmospheric temperature range of −40° C. to 80° C.

In Table 5, there are shown the evaluation results of Examples 1 to 3, Comparative Examples 1 and 2.

TABLE 5

|  | MTF at imaging position of 0 μm | | | Result of |
| --- | --- | --- | --- | --- |
|  | −40° C. | 20° C. | 80° C. | Evaluation |
| Example 1 | 25% | 69% | 25% | Good |
| Example 2 | 53% | 69% | 53% | Good |
| Example 3 | 44% | 69% | 59% | Good |
| Comparative Example 1 | 0% | 69% | 0% | Not Good |
| Comparative Example 2 | 5% | 69% | 5% | Not Good |

Good: MTF at imaging position of 0 μm is 20% or more in a range of −40° C. to 80° C.
Not Good: MTF at imaging position of 0 μm is less than 20% in a range of −40° C. to 80° C.

As illustrated in Table 5, according to Examples 1 to 3 of the present invention, MTF at an image formation position of 0 μm secures 20% or more at an atmospheric temperature range of −40° C. to 80° C., and thus favorable resolution performance can be acquired even when installed as a vehicle-mounted camera. Meanwhile, according to Comparative Examples 1 and 2, an MTF at an image formation position of 0 μm is less than 20% at the atmospheric temperature range of −40° C. to 80° C., and thus cannot acquire sufficient resolution performance when installed as a vehicle-mounted camera. Thus, it is apparent from these evaluation results that the imaging device of the present invention can acquire more favorable resolution performance than a conventional imaging device.

REFERENCE NUMERALS

The First Embodiment

1 imaging device
5 lens assembly
10 lens unit
20 lens holder
21 inner frame (inner part)
22 inner tube (inner extension and contraction part)
22a female screw part (attachment location of lens unit)
23 bottom wall
23a open aperture
24 holding frame (outer part, outer extension and contraction part)
25 outer tube
26 frame part
26a lower end surface (reference surface)
31 linking frame (linking part)
32 cylindrical part
33 upper flange part (attachment location of outer part)
34 lower flange part (attachment location of inner part)
35 image sensor
36 substrate
S optical axis The Second Embodiment

2 imaging device
6 lens assembly
10 lens unit
20A lens holder
21 inner frame (inner part)
22 inner tube (inner extension and contraction part)
22a female screw part (attachment location of lens unit)
24 holding frame (outer part, outer extension and contraction part)
25 outer tube
26a lower end surface (reference surface)
27 middle frame (middle part)
28 middle tube (middle extension and contraction part)
35 image sensor
36 substrate
41 first linking frame (first linking part)
42 cylindrical part
43 upper flange part (attachment location of outer part)
44 lower flange part (attachment location of middle part)
45 second linking frame (second linking part)
46 cylindrical part
47 upper flange part (attachment location of middle part)
48 lower flange part (attachment location of inner part)

The Third Embodiment

3 imaging device
7 lens assembly 10 lens unit
21 inner frame
35 image sensor
50 lens holder
51 inner part
52 inner frame
52a female screw part (attachment location of lens unit)
53 fixed plate
54 holder support (inner extension and contraction part)
55 outer part
56 support (outer extension and contraction part)
56a lower end surface (reference surface)
57 substrate
57a upper surface
57b protruding part
58 linking part
59 linking frame
59a upper end curved parts (attachment location of outer part)
59b lower end curved parts (attachment location of inner part)

What is claimed is:

1. A lens assembly comprising:
a lens unit disposed to face an image sensor; and
a lens holder holding the lens unit, the lens holder comprising:
an inner part to which the lens unit is attached;
an outer part that is disposed on an outside of the inner part relative to an optical axis of the lens unit, and provided with a reference surface to which a positional relationship with the image sensor is configured to be fixed;
a linking part linking the inner part and the outer part;
an inner extension and contraction part for extending and contracting in a direction of the optical axis in association with a change in atmospheric temperature, the inner extension and contraction part being provided between an attachment location of the linking part on the inner part and an attachment location of the lens unit; and
an outer extension and contraction part for extending and contracting in the direction of the optical axis in association with the change in atmospheric temperature, the outer extension and contraction part being provided between an attachment location of the linking part on the outer part and the reference surface,
wherein the inner extension and contraction part and the outer extension and contraction part are designed to extend and contract so as to distance the lens unit from the image sensor when a back focus of the lens unit extends due to the change in atmospheric temperature, and to bring the lens unit close to the image sensor when the back focus of the lens unit contracts due to the change in atmospheric temperature, and
a thermal expansion coefficient of the linking part is smaller than a thermal expansion coefficient of the inner extension and contraction part and a thermal expansion coefficient of the outer extension and contraction part.

2. The lens assembly according to claim 1, wherein the attachment location of the linking part on the inner part is configured to be closer to the image sensor than the attachment location of the linking part on the outer part.

3. The lens assembly according to claim 2, wherein the attachment location of the linking part on the inner part is provided on an end part of an image sensor side of the inner part, and the attachment location of the linking part on the outer part is provided on an end part of an opposite side of an image sensor side of the outer part.

4. The lens assembly according to claim 1, wherein below expression (A) is satisfied:

$$0.5 \leq \{(a1 \times L1 - a2 \times L2 + a3 \times L3) \times \Delta T\}/\Delta Bf \leq 1.5 \quad (A)$$

where
a1: the thermal expansion coefficient of the outer extension and contraction part
a2: the thermal expansion coefficient of the linking part
a3: the thermal expansion coefficient of the inner extension and contraction part
L1: a distance in the direction of the optical axis from the attachment location of the linking part on the outer part to the reference surface
L2: a distance in the direction of the optical axis from the attachment location of the linking part on the outer part to the attachment location of the linking part on the inner part
L3: a distance in the direction of the optical axis from the attachment location of the linking part on the inner part to the attachment location of the lens unit
$\Delta T$: an amount of the change in atmospheric temperature
$\Delta Bf$: a change amount in the back focus per the change in atmospheric temperature.

5. An imaging device, comprising:
the lens assembly of claim 1; and
the image sensor disposed facing the lens unit.

6. A lens assembly comprising:
a lens unit disposed to face an image sensor; and
a lens holder holding the lens unit, the lens holder comprising:
an inner part to which the lens unit is attached;
a middle part disposed on an outside of the inner part relative to an optical axis of the lens unit;
an outer part that is disposed on an outside of the middle part relative to the optical axis, and provided with a reference surface to which a positional relationship with the image sensor is configured to be fixed;
a first linking part linking the outer part and the middle part;
a second linking part linking the middle part and the inner part;
an inner extension and contraction part for extending and contracting in a direction of the optical axis in association with a change in atmospheric temperature, the inner extension and contraction part being provided between an attachment location of the second linking part on the inner part and an attachment location of the lens unit;
a middle extension and contraction part for extending and contracting in the direction of the optical axis in association with the change in atmospheric temperature, the middle extension and contraction part being provided between an attachment location of the first linking part on the middle part and an attachment location of the second linking part on the middle part; and
an outer extension and contraction part for extending and contracting in the direction of the optical axis in association with the change in atmospheric temperature, the outer extension and contraction part being provided between an attachment location of the first linking part on the outer part and the reference surface, wherein the inner extension and contraction part, the middle extension and contraction part, and the outer extension and contraction part are designed to extend and contract so as to distance the lens unit from the image sensor when a back focus of the lens unit extends due to the change in atmospheric temperature, and contract so as to bring the lens unit closer to the image sensor when the back focus of the lens unit contracts due to the change in atmospheric temperature.

7. The lens assembly according to claim 6, wherein the attachment location of the second linking part on the inner part is configured to be closer to the image sensor than the attachment location of the second linking part on the middle part, and the attachment location of the first linking part on the middle part is configured to be closer to the image sensor than the attachment location of the first linking part on the outer part.

8. The lens assembly according to claim 7, wherein the attachment location of the second linking part on the inner part is disposed on an end part of an image sensor side of the inner part, the attachment location of the second linking part on the middle part is disposed on an end part of an opposite side of an image sensor side of the middle part, the attachment location of the first linking part on the middle part is disposed on the end part of the image sensor side of the middle part, and the attachment location of the first linking part on the outer part is disposed on an end part of an opposite side of an image sensor side of the outer part.

9. The lens assembly according to claim 6, wherein thermal expansion coefficients of the first and second linking parts are smaller than thermal expansion coefficients of the inner extension and contraction part, the middle extension and contraction part, and the outer extension and contraction part.

10. The lens assembly according to claim 6, wherein below expression (B) is satisfied:

$$0.5 \leq \{(\alpha1 \times L1 - \alpha2 \times L2 + \alpha3 \times L3 - \alpha4 \times L4 + \alpha5 \times L5) \times \Delta T\}/\Delta Bf \leq 1.5 \quad (B)$$

where $\alpha1$: thermal expansion coefficient of the outer extension and contraction part $\alpha2$: thermal expansion coefficient of the first linking part $\alpha3$: thermal expansion coefficient of the middle extension and contraction part $\alpha4$: thermal expansion coefficient of the second linking part $\alpha5$: thermal expansion coefficient of the inner extension and contraction part L1: a distance in the direction of the optical axis from the attachment location of the first linking part on the outer part to the reference surface L2: a distance in the direction of the optical axis from the attachment location of the first linking part on the outer part to the attachment location of the first linking part on the middle part L3: a distance in the direction of the optical axis from the attachment location of the first linking part on the middle part to the attachment location of the second linking part on the middle part L4: a distance in the direction of the optical axis from the attachment location of the second linking part on the middle part to the attachment location of the second linking part on the inner part L5: a distance in the direction of the optical axis from the attachment location of the second linking part on the inner part to the attachment location of the lens unit $\Delta T$: an amount of the change in atmospheric temperature $\Delta Bf$: a change amount in the back focus per the change in atmospheric temperature.

11. A lens assembly comprising:

a lens unit disposed to face an image sensor; and a lens holder holding the lens unit, the lens holder comprising:

an inner part to which the lens unit is attached;

a plurality of middle parts disposed in order from an inside to an outside relative to an optical axis of the lens unit;

an outer part that is disposed outside of the plurality of middle parts relative to the optical axis, and provided with a reference surface to which a positional relationship with the image sensor is configured to be fixed;

a first linking part linking an outermost middle part and the outer part;

a second linking part linking an innermost middle part and the inner part;

a third linking part linking middle parts adjacent to each other;

an inner extension and contraction part for extending and contracting in the direction of the optical axis in association with a change in atmospheric temperature, the inner extension and contract part being provided between an attachment location of the second linking part on the inner part and an attachment location of the lens unit;

a middle extension and contraction part for extending and contracting in the direction of the optical axis in association with the change in atmospheric temperature, the middle extension and contraction part being provided between an attachment location of the first linking part on the outermost middle part and an attachment location of the third linking part on the outermost middle part, and between an attachment location of the second linking part on the innermost middle part and an attachment location of the third linking part on the innermost middle part;

an outer extension and contraction part for extending and contracting in the direction of the optical axis in association with the change in atmospheric temperature, the outer extension and contraction part being disposed between an attachment location of the first linking part on the outer part and the reference surface, wherein the inner extension and contraction part, the middle extension and contraction part, and the outer extension and contraction part are designed to extend and contract so as to distance the lens unit from the image sensor when a back focus of the lens unit extends due to the change in atmospheric temperature, and to bring the lens unit close to the image sensor when the back focus of the lens unit contracts due to the change in atmospheric temperature.

12. The lens assembly according to claim 11, wherein the lens holder comprises three or more of the middle parts and a plurality of the third linking parts, and the middle extension and contraction part is additionally provided between attachment locations of the third linking parts on the middle parts and attachment locations of other third linking parts on the middle parts.

\* \* \* \* \*